United States Patent
Huffman et al.

[11] Patent Number: 5,815,407
[45] Date of Patent: Sep. 29, 1998

[54] METHOD AND DEVICE FOR INHIBITING THE OPERATION OF AN ELECTRONIC DEVICE DURING TAKE-OFF AND LANDING OF AN AIRCRAFT

[75] Inventors: James R. Huffman, Austin, Tex.; Ronald D. Cruickshank, Durham, N.C.; Shrirang Nikanth Jambhekar, Schaumburg, Ill.; Jeffrey Van Myers, Driftwood; Russell L. Collins, Austin, both of Tex.

[73] Assignee: Motorola Inc., Schaumburg, Ill.

[21] Appl. No.: 572,603

[22] Filed: Dec. 14, 1995

[51] Int. Cl.$^6$ .............................. G08B 21/00; B64C 19/00
[52] U.S. Cl. .................. 364/492; 364/566; 244/76 R; 244/183; 244/191; 395/182.12; 395/182.2; 395/182.22; 395/750.02; 395/750.03; 340/945; 340/959; 340/960; 340/971; 701/5; 701/9; 701/14; 701/15; 701/16
[58] Field of Search ................... 364/427–428, 364/424.06, 566, 492; 395/182.12, 182.13, 182.2, 182.22, 750.01, 750.05, 750.02, 750.08; 340/500, 588, 571, 635–636, 945, 959, 960, 963, 971, 973, 975, 978; 244/76 R, 183, 191; 701/5, 14, 15, 16, 9

[56] References Cited

U.S. PATENT DOCUMENTS

| Re. 32,655 | 4/1988 | Levine . | |
|---|---|---|---|
| 3,748,753 | 7/1973 | Whitcomb et al. . | |
| 3,818,130 | 6/1974 | Uhler . | |
| 4,001,561 | 1/1977 | Quaintance . | |
| 4,006,870 | 2/1977 | Boone et al. | 244/184 |
| 4,094,479 | 6/1978 | Kennedy, Jr. | 244/179 |
| 4,159,417 | 6/1979 | Rubincam . | |
| 4,160,242 | 7/1979 | Fowler et al. | 340/711 |
| 4,350,070 | 9/1982 | Bahu | 84/1.03 |
| 4,397,635 | 8/1983 | Samuels | 434/178 |
| 4,528,643 | 7/1985 | Freeny, Jr. . | |
| 4,548,510 | 10/1985 | Levine . | |
| 4,579,533 | 4/1986 | Anderson et al. | 434/157 |
| 4,622,546 | 11/1986 | Sfarti et al. . | |
| 4,639,225 | 1/1987 | Washizuka | 434/308 |
| 4,646,241 | 2/1987 | Ratchford et al. | 364/424.06 |
| 4,661,976 | 4/1987 | Basch . | |
| 4,757,302 | 7/1988 | Hatakeyama et al. . | |
| 4,774,596 | 9/1988 | Hashimoto | 358/335 |
| 4,779,080 | 10/1988 | Coughlin et al. | 340/712 |

(List continued on next page.)

OTHER PUBLICATIONS

European Patent Application 8902170.8, Hirano, Tadashi, Jul. 28, 1989.
"Mastering Wordperfect 5.1 & 5.2 for Windows" by Alan Simpson pp. 341–356.
"Users Guide –Microsoft Word, Word Processing Program for the Macintosh Version 5.0" pp. 236–248.
Business Wire, Dateline: Englewood, Colorado. Sep. 26, 1995.
News Release, Dateline: London, United Kingdom. May 22, 1990.
Franklin Electronic Pins Hopes on Digital Book System, Wall Street Journal 3 Star, Eastern (Princeton, NJ) Edition May 25, 1993 p. B4.
Margaret Levine Young and David C. Kay, Word Perfect 6.1 for Windows for Dummies 2nd edition, pp. 50–59 and 105–115.
Elman, Donald and Stephen J. Matlock, Microsoft Windows 3.1, Step by Step 1992 by Catapult, Inc. pp. 21–25.
"A retiree who has spent a lifetime tinkering with electronics has dreamed up a device to read computerized books." by Fred Wright, Jr. Tribune Correspondent, Story in Tampa Tribune, Saturday, Aug. 26, 1995.

*Primary Examiner*—Emanuel T. Voeltz
*Assistant Examiner*—Tuan Q. Dam
*Attorney, Agent, or Firm*—K. Cyrus Khosravi

[57] ABSTRACT

An apparatus (700) for inhibiting operation of an electronic device (702) during take-off and landing of an aircraft (802) has a sensor (704) that measures a lateral acceleration. A control circuit (706) is coupled to the sensor (704) and has an output (708) coupled to the electronic device (702).

31 Claims, 33 Drawing Sheets

U.S. PATENT DOCUMENTS

| | | |
|---|---|---|
| 4,812,629 | 3/1989 | O'Neil et al. . |
| 4,820,167 | 4/1989 | Nobles et al. ............................ 434/336 |
| 4,838,796 | 6/1989 | Gozdowiak . |
| 4,854,878 | 8/1989 | Malvino et al. ......................... 434/335 |
| 4,855,725 | 8/1989 | Fernandez ................................ 340/706 |
| 4,867,628 | 9/1989 | Ammon et al. . |
| 4,884,974 | 12/1989 | DeSmet ..................................... 434/317 |
| 4,899,292 | 2/1990 | Montagna et al. ...................... 364/521 |
| 4,912,671 | 3/1990 | Ishida ........................................ 364/900 |
| 4,914,624 | 4/1990 | Dunthorn . |
| 4,931,950 | 6/1990 | Isle et al. . |
| 4,954,697 | 9/1990 | Kokubun et al. . |
| 4,979,216 | 12/1990 | Malsheen et al. . |
| 4,985,697 | 1/1991 | Boulton .................................... 340/750 |
| 4,994,912 | 2/1991 | Lumelsky et al. ....................... 358/140 |
| 4,997,374 | 3/1991 | Simone ..................................... 434/317 |
| 5,007,838 | 4/1991 | Cochran . |
| 5,021,989 | 6/1991 | Fujisawa et al. ........................ 364/900 |
| 5,036,472 | 7/1991 | Buckley et al. . |
| 5,060,135 | 10/1991 | Levine et al. . |
| 5,072,893 | 12/1991 | Chakravarty et al. ................ 244/76 R |
| 5,086,300 | 2/1992 | Ashmore . |
| 5,095,195 | 3/1992 | Harman et al. . |
| 5,109,354 | 4/1992 | Yamashita et al. . |
| 5,113,346 | 5/1992 | Orgun et al. ............................. 364/428 |
| 5,119,079 | 6/1992 | Hube et al. . |
| 5,132,915 | 7/1992 | Goodman . |
| 5,146,552 | 9/1992 | Cassorla et al. ......................... 395/145 |
| 5,147,205 | 9/1992 | Gross et al. . |
| 5,153,831 | 10/1992 | Yianilos . |
| 5,155,663 | 10/1992 | Harase . |
| 5,155,842 | 10/1992 | Rubin ..................................... 395/182.2 |
| 5,157,783 | 10/1992 | Anderson et al. ....................... 395/600 |
| 5,165,016 | 11/1992 | Takahashi ................................ 395/165 |
| 5,167,508 | 12/1992 | Mc Taggart ............................. 434/317 |
| 5,173,051 | 12/1992 | May et al. ................................ 434/118 |
| 5,189,400 | 2/1993 | Schultz ..................................... 340/636 |
| 5,199,104 | 3/1993 | Hirayama ................................. 395/145 |
| 5,208,745 | 5/1993 | Quentin et al. .......................... 364/188 |
| 5,214,696 | 5/1993 | Keiser, II et al. ............................ 380/4 |
| 5,228,859 | 7/1993 | Rowe ........................................ 434/118 |
| 5,233,333 | 8/1993 | Borsuk ..................................... 340/731 |
| 5,239,468 | 8/1993 | Sewersky et al. ................... 364/424.04 |
| 5,239,540 | 8/1993 | Rovira et al. . |
| 5,239,665 | 8/1993 | Tsuchiya .................................. 395/800 |
| 5,241,671 | 8/1993 | Reed et al. ............................... 395/600 |
| 5,243,582 | 9/1993 | Yamauchi et al. ........................ 369/32 |
| 5,253,362 | 10/1993 | Nolan et al. . |
| 5,256,067 | 10/1993 | Gildea et al. ............................ 434/169 |
| 5,263,158 | 11/1993 | Janis . |
| 5,274,356 | 12/1993 | Taricco . |
| 5,275,569 | 1/1994 | Watkins ................................... 434/157 |
| 5,301,172 | 4/1994 | Richards et al. .......................... 369/32 |
| 5,302,132 | 4/1994 | Corder ..................................... 434/156 |
| 5,303,214 | 4/1994 | Kulakowski et al. . |
| 5,321,609 | 6/1994 | Yianilos et al. . |
| 5,330,360 | 7/1994 | Marsh et al. . |
| 5,339,091 | 8/1994 | Yamazaki et al. ....................... 345/104 |
| 5,347,579 | 9/1994 | Blandford . |
| 5,347,628 | 9/1994 | Brewer et al. . |
| 5,350,303 | 9/1994 | Fox et al. ................................. 434/118 |
| 5,351,190 | 9/1994 | Kondo ................................. 364/419.08 |
| 5,355,352 | 10/1994 | Kobayashi et al. ...................... 368/281 |
| 5,367,623 | 11/1994 | Iwai et al. . |
| 5,375,037 | 12/1994 | Le Roux . |
| 5,384,893 | 1/1995 | Hutchins . |
| 5,404,444 | 4/1995 | Billings . |
| 5,404,458 | 4/1995 | Zetts . |
| 5,406,261 | 4/1995 | Glenn ....................................... 340/571 |
| 5,410,598 | 4/1995 | Shear . |
| 5,417,575 | 5/1995 | McTaggart . |
| 5,437,552 | 8/1995 | Baer et al. . |
| 5,440,730 | 8/1995 | Elmasri et al. . |
| 5,454,046 | 9/1995 | Carman, II . |
| 5,463,713 | 10/1995 | Hasegawa . |
| 5,463,725 | 10/1995 | Henckel et al. . |
| 5,475,398 | 12/1995 | Yamazaki et al. . |
| 5,475,399 | 12/1995 | Borsuk . |
| 5,483,596 | 1/1996 | Rosenow et al. . |
| 5,511,646 | 4/1996 | Maldanis et al. . |
| 5,513,116 | 4/1996 | Buckley et al. . |
| 5,513,117 | 4/1996 | Small . |
| 5,515,277 | 5/1996 | Mine ................................. 364/424.046 |
| 5,523,775 | 6/1996 | Capps . |
| 5,524,201 | 6/1996 | Shwarts et al. . |
| 5,528,450 | 6/1996 | Willoughby et al. . |
| 5,530,942 | 6/1996 | Tzou et al. . |
| 5,531,328 | 7/1996 | Rochelo et al. . |
| 5,531,600 | 7/1996 | Baer et al. . |
| 5,533,180 | 7/1996 | Zhou et al. . |
| 5,534,888 | 7/1996 | Lebby et al. . |
| 5,537,292 | 7/1996 | Bowen . |
| 5,538,430 | 7/1996 | Smith et al. . |
| 5,543,779 | 8/1996 | Aspesi et al. ............................ 340/539 |
| 5,546,316 | 8/1996 | Buckley et al. . |
| 5,555,343 | 9/1996 | Luther . |
| 5,559,897 | 9/1996 | Brown et al. . |
| 5,561,736 | 10/1996 | Moore et al. . |
| 5,572,625 | 11/1996 | Raman et al. . |
| 5,586,242 | 12/1996 | McQueen, III et al. . |
| 5,592,605 | 1/1997 | Asuma et al. . |
| 5,596,700 | 1/1997 | Darnell et al. . |
| 5,602,570 | 2/1997 | Capps et al. . |

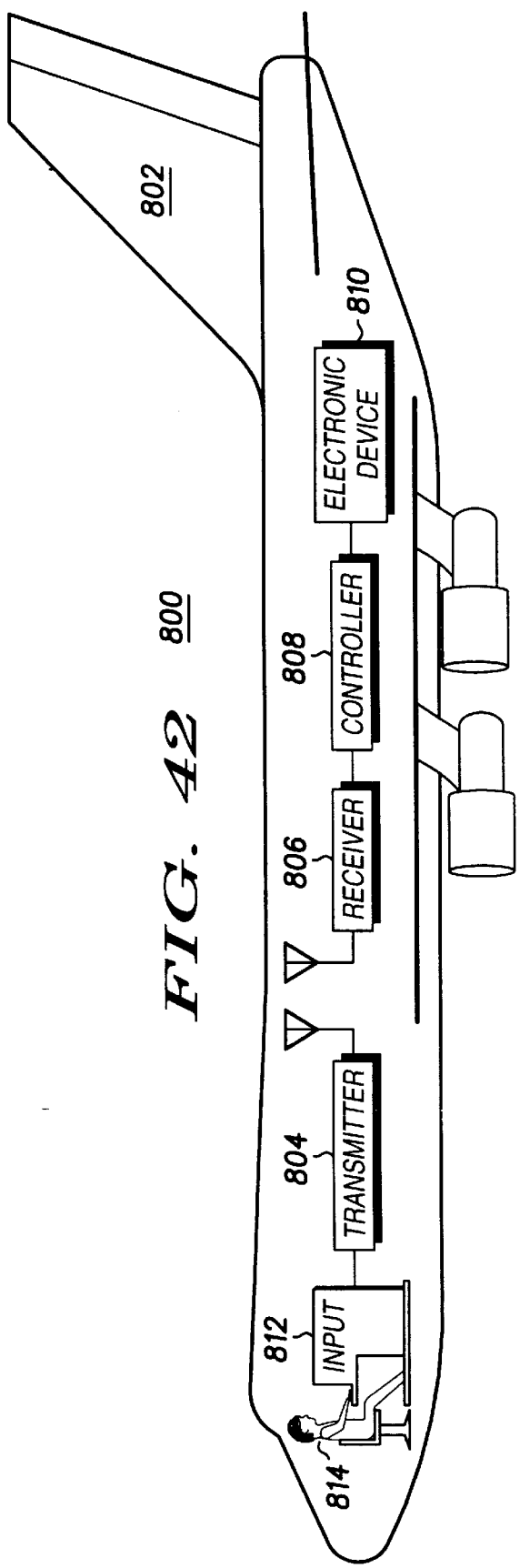

METHOD AND DEVICE FOR INHIBITING THE OPERATION OF AN ELECTRONIC DEVICE DURING TAKE-OFF AND LANDING OF AN AIRCRAFT

RELATED INVENTION

The present invention is related to the following invention which is assigned to the same assignee as the present invention:

"System and Method for Limiting Access to a Book Card", having Ser. No. 572,346, filed concurrently herewith.

"Apparatus and Method for Storing and Presenting Text", having Ser. No. 572,451, filed concurrently herewith.

"Method and Electronic Book for Creating a Plurality of Versions of a Book", having Ser. No. 572,485, filed concurrently herewith.

"An Electronic Book Diary and Method", having Ser. No. 572,602, filed concurrently herewith.

"Method and System for Inhibiting the Operation of an Electronic Device During Take-Off and Landing of an Aircraft", having Ser. No. 572,484, filed concurrently herewith.

"Method and Apparatus for Abridging Text", having Ser. No. 572,834, filed concurrently herewith.

"A Method of Substituting Names in an Electronic Book", having Ser. No. 572,480, filed concurrently herewith.

"System and Method of Authoring Tools for an Electronic Book", having Ser. No. 572,358, filed concurrently herewith.

"System and Method for an Automatic Library for a Plurality of Book Cards", having Ser. No. 572,482, filed concurrently herewith.

"Electronic Book and Method of Selecting a Primary Font and a Primary Size for Displaying Text Therewith", having Ser. No. 572,407, filed concurrently herewith.

"Electronic Book and Graphical User Interface for Selecting a Book to Read Therewith", having Ser. No. 572,406, filed concurrently herewith.

"Electronic Book and Graphical User Interface to Provide Control Thereof", having Ser. No. 572,403, filed concurrently herewith.

"Electronic Book and Method of Storing at Least One Book in an Internal Machine-Readable Storage Medium", having Ser. No. 572,593, filed concurrently herewith.

"Electronic Book and Method of Annotation Therefor", having Ser. No. 572,367, filed concurrently herewith.

"Electronic Book and a Method of Displaying a Relative Position of a Current Page of a Book Therefor", having Ser. No. 572,373, filed concurrently herewith.

"Method and System for Encoding a Book for Reading Using an Electronic Book", having Ser. No. 572,468, filed concurrently herewith.

"Electronic Book and Method of Displaying an Animated Page Turn Therefor", having Ser. No. 572,405, filed concurrently herewith.

"Electronic Book and Method of Controlling a Rate of Information Displayed Thereby", having Ser. No. 572,372, filed concurrently herewith.

"Reusable Housing and Memory Card Therefor", having Ser. No. 572,413, filed concurrently herewith.

"Electronic Book and Method of Displaying at Least One Reading Metric Therefor", having Ser. No. 572,842, filed concurrently herewith.

"Electronic Book and Method of Creating a Personal Log of Reading Activity Therefor", having Ser. No. 572,456, filed concurrently herewith.

"Electronic Book Having Highlighting Feature", having Ser. No. 572,469, filed concurrently herewith.

"Electronic Book and Method of Capturing and Storing a Quote Therein", having Ser. No. 572,601, filed concurrently herewith.

The subject matter of the above-identified related inventions are hereby incorporated by reference into the disclosure of this invention.

FIELD OF THE INVENTION

The present invention relates generally to the field of electronic information devices and more particularly to a method and apparatus for inhibiting the operation of an electronic device during take-off and landing of an aircraft.

BACKGROUND OF THE INVENTION

Operation of an electronic device during take-offs and landings of an aircraft can interfere with critical electronic signals for the operation of the aircraft. As a result the FAA prohibits the operation of certain electronic devices by passengers during take-offs and landings. However, this does not insure deliberate violators and careless passengers to not operate their electronic devices during these critical periods. Thus there exists a need for a method and apparatus that inhibits the operation of electronic devices during take-offs and landings of an aircraft.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 42 is a block diagram of a system for inhibiting operation of an electronic device;

FIG. 43 is a block diagram of an embodiment of an apparatus for inhibiting operation of an electronic device integrated into the electronic device;

DETAILED DESCRIPTION OF THE DRAWINGS

Figure 1:
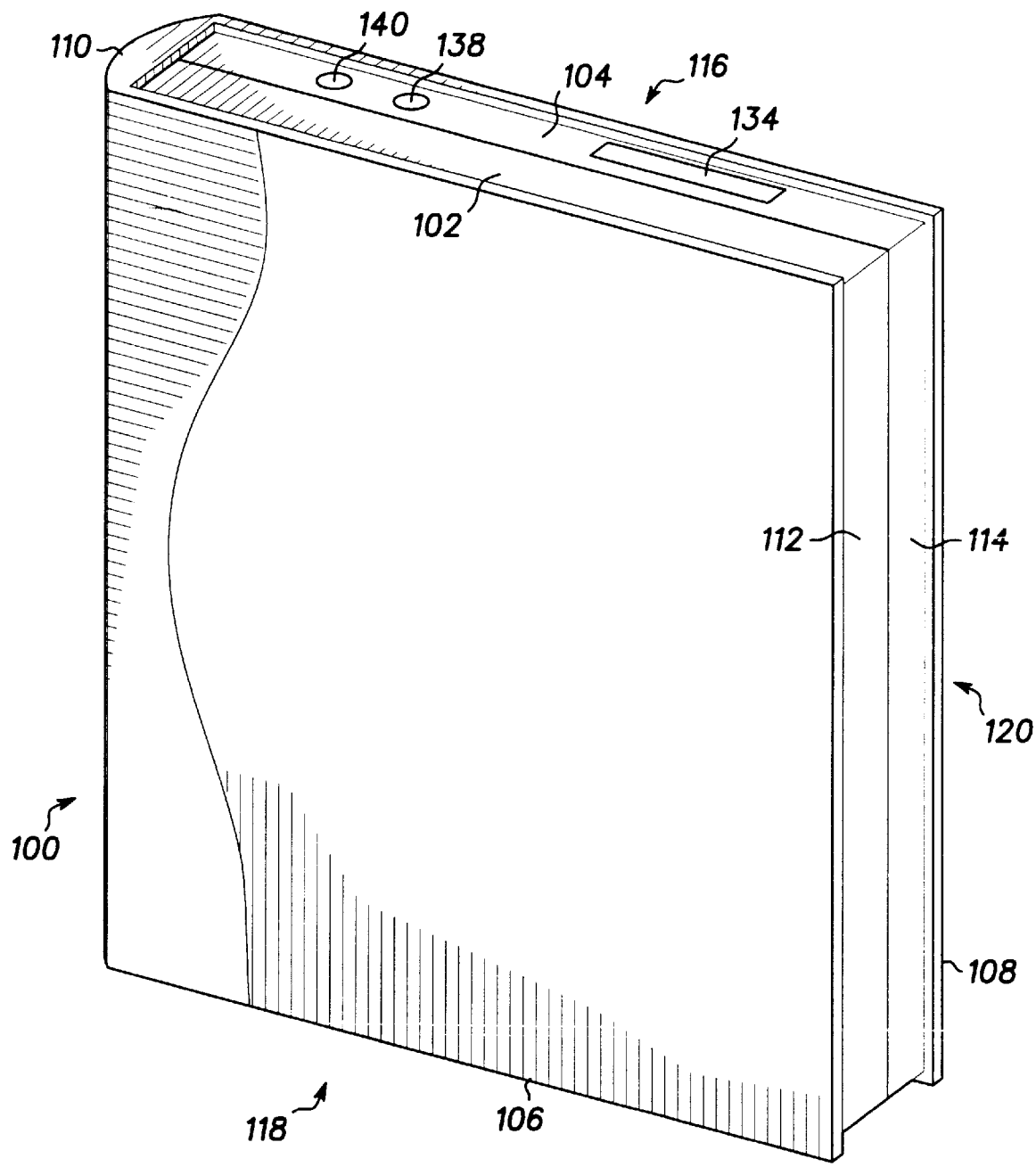
FIG. 1 is a view of an embodiment of an electronic book in a closed position.

FIG. 1 is a view of an embodiment of an electronic book in a closed position. The electronic book has a book-shaped housing 100 having the look and feel of a real, paper book. The book-shaped housing 100 has a first housing member 102 pivotably connected to a second housing member 104 to facilitate opening and closing in a book-like manner. The first housing member is partially formed by a book-like, front cover member 106. In a similar manner, the second housing member 104 is partially formed by a book-like, back cover member 108. The front cover member 106 and the back cover member 108 are pivotably connected by a spine member 110.

To better provide the look and feel of a real book, the front cover member 106 and the back cover member 108 have an exterior made of a material used in real book covers. Examples of such a material include, but are not limited to, leather, simulated leather, vinyl, and a woven fabric such as cotton. The exterior can either be permanently affixed to the front cover member 106 and the back cover member 108, or be in the form of a removable jacket.

In addition to the front cover member 106, the first housing member 102 is partially defined by an enclosure 112. Similarly, the second housing member 104 is partially defined by an enclosure 114 in addition to the back cover member 108. When the electronic book is in the closed position, the enclosure 112 and the enclosure 114 have an external appearance of edges of pages of a real, paper book. In particular, the enclosures 112 and 114 define a top edge 116, a bottom edge 118, and a foredge 120 which appear as the top edge, the bottom edge, and the foredge, respectively, of a real, paper book. The top edge 116, the bottom edge 118, and the foredge 120 are recessed with respect to the front cover member 106 and the back cover member 108.

Figure 2:
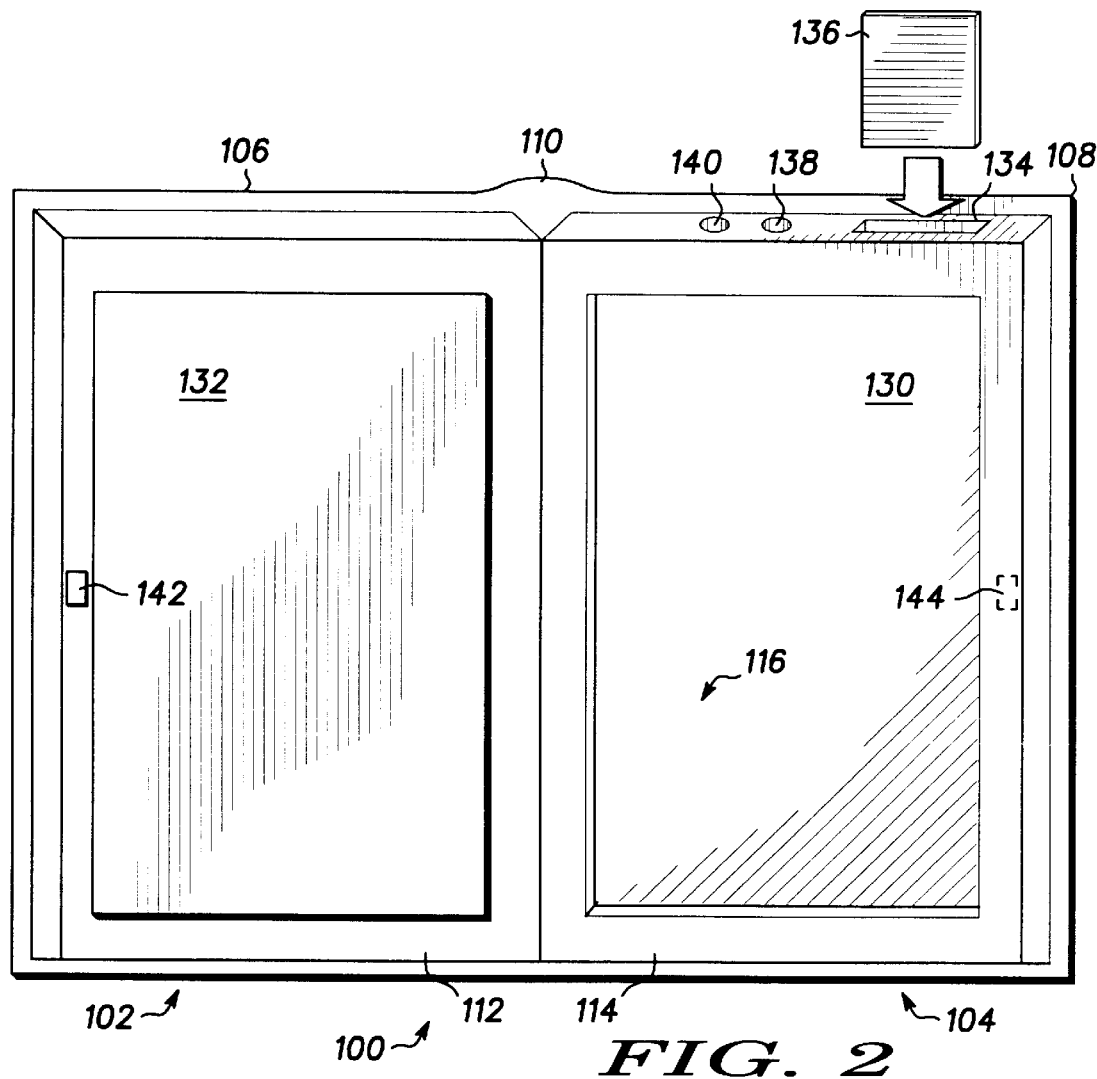
FIG. 2 is a view of the embodiment of the electronic book of FIG. 1 in an open position.

FIG. 2 is a view of the embodiment of the electronic book of FIG. 1 in an open position. It is preferred that the first housing member 102 and the second housing member 104 be substantially symmetric so that the front cover member 106, the back cover member 108, and the spine member 110 rest substantially flat on a flat surface in the open position. The substantial symmetry makes the electronic book feel like a real, paper book being opened to one of its middle pages. As a result, the electronic book can be comfortably held and read in a manner consistent with a paper book.

A touchscreen 130 is integrated in the book-shaped housing 100 to be accessible when the book-shaped housing 100 is opened in the book-like manner. In the embodiment illustrated in FIG. 2, the touchscreen 130 is integrated with the enclosure 114 of the second housing member 104. Optionally, a second touchscreen 132 can also be integrated in the book-shaped housing. As illustrated, the second touchscreen 132 can be integrated with the enclosure 112 of the first housing member 102.

The touchscreen 130 and the second touchscreen 132 each include a touch-sensitive panel over a display device. Behind the display device can be a backlighting element.

The touchscreen 130 and the second touchscreen 132 may provide either a color display or a monochrome display depending on a particular model of the electronic book. To provide their touch sensitivity, the touchscreen 130 and the second touchscreen 132 can utilize analog resistive technology as is known in the art. It is noted, however, that other technologies for providing touch sensitivity can also be utilized.

It is preferred that the touchscreen 130 and the second touchscreen 132 be capable of providing backlighting to allow use of the electronic book in poorly-lit or dimly-lit environments. More preferably, the touchscreen 130 is capable of backlighting selected portions or subsets of the entire touchscreen 130. Here, the electronic book can provide a power-saving mode wherein only a portion of the touchscreen 130 being viewed by a user is actively backlit.

The book-shaped housing includes a receiving slot 134 which physically receives a removable machine-readable storage medium 136. The removable machine-readable storage medium 136 contains machine-readable data representative of text from a book. Optionally, the machine-readable data is also representative of graphical information within the book. It is noted that the term "book" should be construed broadly as any written or printed composition having textual information which is read by an individual. Hence, the term "book" should be inclusive of books, magazines, newspapers, or the like.

The text and the graphical information contained in the removable machine-readable storage medium 136 are displayed on the touchscreen 130. The second touchscreen 132 can be included to display graphical information while the touchscreen 130 displays text. As another option, the touchscreen 130 and the second touchscreen 132 can display neighboring pages of the book. Further, the touchscreen 130 and the second touchscreen 132 can be utilized to simultaneously view two books. The second touchscreen 132 can also be utilized in a second level operating system, which is herein called an advanced reader graphical user interface. The functionality of the second touchscreen 132 can be selected by the user using a switch or the advanced reader graphical user interface in the electronic book.

It is noted that there are a number of ways to encode the text and the graphical information within the book for storage on the removable machine-readable storage medium 136. In one embodiment, the removable machine-readable storage medium 136 contains a series of pointers which point to words contained in a dictionary within the electronic book. Words which are not contained in the dictionary are located in a customized dictionary on the removable machine-readable storage medium 136. In this way, the words to be presented on the touchscreen 130 are selected with minimal storage requirements in the removable machine-readable storage medium 136.

Preferably, the removable machine-readable storage medium 136 is in the form of either a smart card or a PCMCIA card. Here, the receiving slot 134 is shaped to receive either a smart card or a PCMCIA card.

The book-shaped housing 100 further defines a power-receiving port 138 and a data-receiving port 140. The power-receiving port 138 receives a plug or other type of connector to supply power to the electronic book. Power supplied to the electronic book via the power receiving port 138 can be used to directly operate the electronic book or to recharge batteries internal to the electronic book. In one embodiment of the electronic book, the spine member 110 is shaped to receive a combination of battery cells which can be recharged via the power-receiving port 138. If the second touchscreen 132 is not used, the enclosure 112 of the first housing member 102 can be used to store extra batteries and/or extra book cards.

The data port 140 is utilized to communicate signals representative of machine-readable data between the electronic book and an external device. The data port 140 can be used, for example, to receive machine-readable data signals representative of text and graphics in a book from the external device for storage in the electronic book. In this manner, the data port 140 provides an alternative to the receiving slot 134 for receiving text and graphics of a book. Additionally, the data port 140 can be utilized to transmit machine-readable data contained within the electronic book to the external device.

Preferably, the electronic book is automatically activated (i.e., automatically turns on) when in the open position, and is automatically deactivated (i.e. automatically turns off) when in the closed position. To this end, the electronic book can include a magnet 142 incorporated within one of the first housing member 102 or the second housing member, and a reed switch 144 incorporated within the other housing member. When the electronic book is in the closed position, the magnet 142 is proximate to the reed switch 144. The magnetic field generated by the magnet 142 causes the reed switch 144 to assume a first switch position which deactivates the electronic book. When the electronic book is in the open position, the magnet 142 is distant from the reed switch 144. In absence of a significant magnetic field, the reed switch 144 returns to a second switch position which activates the electronic book.

It is noted that in alternative embodiments, the electronic book is activated and deactivated by an external switch or button (not specifically illustrated) rather than by the reed switch 144.

Figure 3:
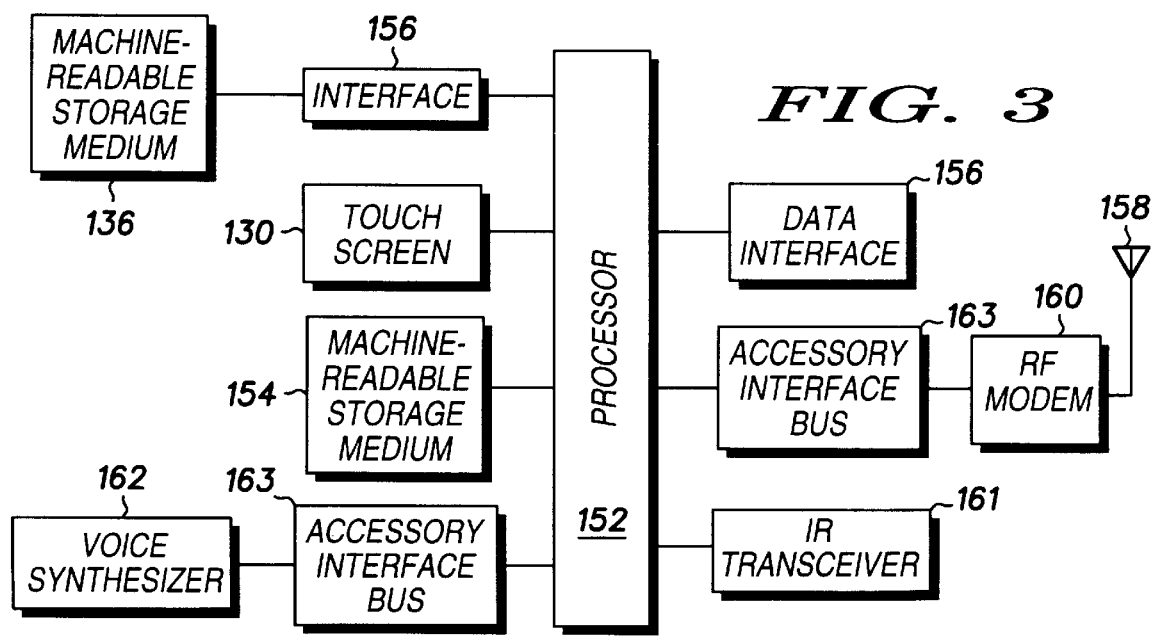
FIG. 3 is a block diagram of an embodiment of the electronic book.

FIG. 3 is a block diagram of an embodiment of the electronic book. An interface 150 receives the removable machine-readable storage medium 136 containing machine-readable data representative of text and graphics from a book. In a preferred embodiment of the present invention, the interface 150 comprises a PCMCIA interface which receives a removable machine-readable storage medium in the form of a PCMCIA card. Physically, the interface 150 is proximate to the receiving slot 134 illustrated in FIG. 2.

In general, it is preferred that the interface 150 be capable of receiving an external device other than a machine-readable storage medium. Further, it is preferred that the interface 150 be capable of receiving a plurality of external devices. To these ends, the interface 150 can comprise a plurality of similar interfaces, such as a plurality of PCMCIA interfaces. Here, the electronic book can simultaneously receive two or more of a PCMCIA memory card, a PCMCIA modem, or another PCMCIA device.

A processor 152 is in communication with the interface 150 to read the machine-readable data from the removable machine-readable storage medium 136. The processor 152 can be in the form of a microprocessor, a custom integrated circuit, an application specific integrated circuit, or a programmable logic array, for example. Physically, the processor 152 is housed within the book-shaped housing 100.

The touchscreen 130 is in communication with the processor 152 to display a page of the text and/or the graphics represented by the machine-readable data. Further, the touchscreen 130 acts as an input device to receive user-initiated events, i.e. user-initiated actions, and communicate these user-initiated events or actions to the processor 152.

An internal machine-readable storage medium 154 is in communication with the processor 152 to support a number of operative features of the electronic book. The internal machine-readable storage medium 154 can include one or more memory devices, such as a random access memory, a read-only memory, and/or an electronically erasable and programmable read-only memory (EEPROM).

A computer program or other form of software or firmware is stored in the internal machine-readable storage medium 154. The computer program directs the processor 152 to support the operative features of the electronic book. Preferably, the computer program includes an event loop that processes and responds to user-initiated events and actions. More specifically, received events are placed in an event queue in the internal machine-readable storage medium 154. Each of the received events is processed and removed from the event queue. As a result, a user can initiate a number of events or actions without having to wait for previous actions to be processed.

The internal machine-readable storage medium 154 can also include a dictionary to which pointers stored in the removable machine-readable storage medium 136 point. By including the dictionary within the electronic book, less storage space is required on the removable machine-readable storage medium 136 to store the text from the book.

Further, the internal machine-readable storage medium 154 can contain machine-readable data representative of text and graphics from a book. Here, the processor 152 reads the machine-readable data from the internal machine-readable storage medium 154 and commands the touchscreen 130 to display pages of the text and graphics.

Signals are communicated between the electronic book and an external device via either a data interface 156 in communication with the processor 152, via an antenna 158 and a radio frequency modem 160 in communication with the processor 152, or via an infrared transceiver 161 in communication with the processor. As another option, communication between the electronic book and the external device can be effectuated using either a smart communication card or a PCMCIA communication card received by the interface 150. Here, a PCMCIA modem card or a PCMCIA infrared transceiver card can be utilized, for example, for external communication.

Optionally, a voice synthesizer 162 is included in the electronic book to provide a spoken auditory display of pages of the text read from either the removable machine-readable storage medium 136 or the internal machine-readable storage medium 154. In one embodiment, the processor 152 directly converts the text from the book into speech signals for the voice synthesizer 162. Optionally, control codes can be provided within the removable machine-readable storage medium 136 to allow words to be pronounced or emphasized in different ways. Further, the control codes can command the words to be spoken in either a male voice, a female voice, or a child's voice. The synthesized voice can be sampled (such as using the user's voice) or can be a computer-synthesized voice.

As an alternative, a custom voice dictionary can be provided to augment a general voice dictionary stored in the electronic book. The customized voice dictionary can be used for alternative pronunciations, voices, and emphasis.

The voice synthesizer 162 is either permanently integrated in the electronic book or is a removable accessory. To facilitate removability, the voice synthesizer 162 can be embodied within a smart card or a PCMCIA card for reception by the interface 150. Alternatively, the voice synthesizer 162 can communicate with the processor 152 via an accessory interface bus 163. In a similar manner, the RF modem 160 and/or the second touchscreen 132 can communicate with the processor 152 via the accessory interface bus 163.

Before giving a detailed description of steps performed by the elements of FIG. 3 for the various embodiments of the present invention, a functional description of a particular embodiment of the electronic book will now be described. This embodiment is based on a single touchscreen, namely the touchscreen 130, to display the text and the graphics of the book and to allow a user to control the electronic book. It is noted, however, that the teachings herein can also be applied to a dual touchscreen embodiment which further includes the second touchscreen 132. Furthermore, it is noted that the teachings herein are not limited to the use of a touchscreen, and hence, can be applied to an electronic book containing any type of display device (such as a liquid crystal display or a cathode ray tube, for example) and any type of input device (such as a series of buttons, a mouse, a trackball, a lightpen, or a touchpad, for example).

Figure 4:
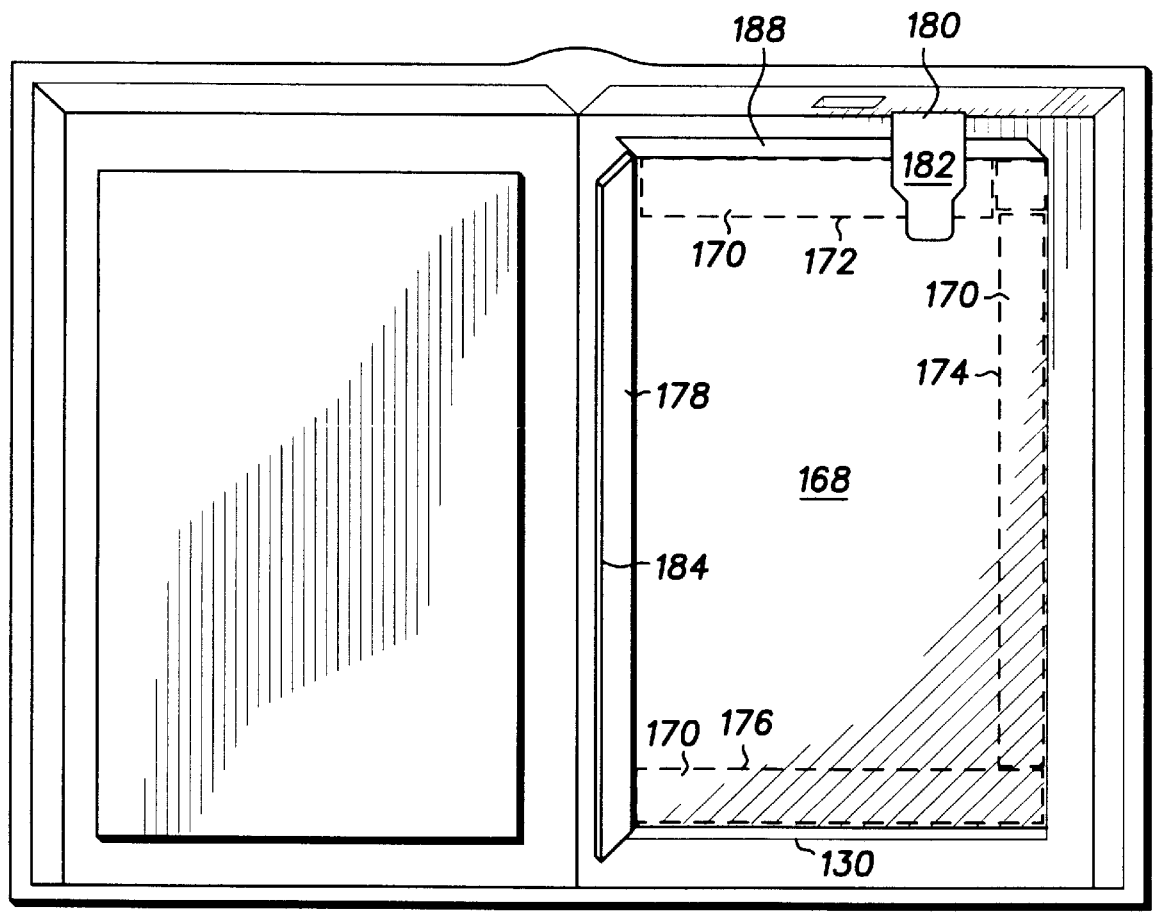
FIG. 4 is an illustration of various hot spot locations used to provide control of the electronic book to a user.

FIG. 4 is an illustration of various hot spot locations used to provide control of the electronic book to a user. A page of the text represented by the machine-readable data read from either the removable machine-readable storage medium 136 or the internal machine-readable storage medium 154 is displayed on a display portion 168 of the touchscreen 130. The display portion 168 is also utilized to display graphics represented by the machine-readable data.

A first hot spot portion 170 of the touchscreen 130 is designated for receiving a predetermined user-initiated event which requests that a subsequent page of the text be displayed on the touchscreen 130. Hence, the first hot spot portion 170 can be synonymously referred to as an "advance page portion" or an "advance page hot spot" for receiving an advance page event. In the embodiment illustrated in FIG. 4, the first hot spot portion 170 includes a top margin portion 172, a side margin portion 174, and a bottom margin portion 176 of the touchscreen 130. The top margin portion 172 is located above the display portion 168, the side margin portion 174 is located beside the display portion 168, and the bottom margin portion 176 is located below the display portion 168.

A second hot spot portion 178 of the touchscreen 130 is designated for receiving a predetermined user-initiated event which requests that a previous page of the text be displayed. Hence, the second hot spot portion 178 can be synonymously referred to as a "page back portion" or a "page back hot spot" for receiving a page back event. In the embodiment illustrated in FIG. 4, the second hot spot portion 178 is located beside the display portion 168 of the touchscreen 130 and opposite the side margin portion 174.

A third hot spot portion 180 of the touchscreen 130 is designated for receiving a predetermined user-initiated event which requests that a pre-marked page be displayed on the touchscreen 130. In the embodiment of FIG. 4, the third hot spot portion 180 is located in an upper portion of the touchscreen 130 and is shaped as a bookmark graphic 182. Hence, the third hot spot portion 180 can be synonymously referred to as a "bookmark portion" or a "bookmark hot spot".

A fourth hot spot portion 184 of the touchscreen 130 is designated for receiving a predetermined user-initiated event to close the current book being read and to request that a library screen be displayed on the touchscreen 130. The library screen is utilized by a user to select a book to read from a plurality of books within a library. Hence, the fourth hot spot portion 184 can be synonymously referred to as a "close book portion" or a "close book hot spot" for receiving a close book event.

A fifth hot spot portion 186 of the touchscreen 130 is designated for receiving a predetermined user-initiated event which requests that the displayed page be marked. In the embodiment of FIG. 4, the fifth hot spot portion 186 is located in an upper corner of the touchscreen 130. In this embodiment, the fifth hot spot portion 186 of the touchscreen 130 is utilized for dog-earring pages of the book. Hence, the fifth hot spot portion 186 can be synonymously referred to as a "dog ear portion" or a "dog ear hot spot" for receiving a dog ear event.

A sixth portion 188 of the touchscreen 130 is designated to provide a depth indication representative of how much of the book is left to be read. In the embodiment illustrated in FIG. 4, the sixth portion 188 is located above the display portion 168. The second hot spot portion 178 can be utilized in conjunction with the sixth portion 188 to provide the depth indication.

In the embodiment of FIG. 4, the display portion 168, the first hot spot portion 170, the second hot spot portion 178, the third hot spot portion 180, the fourth hot spot portion 184, and the fifth hot spot portion 186 are mutually exclusive (i.e. non-overlapping) portions of the touchscreen 130. However, in alternative embodiments of the present invention, these portions may not be mutually exclusive, and hence may overlap. Further, some embodiments of the present invention may utilize different sizes and positions for the above-described hot spot portions.

Preferably, the hot spot portions are motion sensitive so that a touch event, a touch-and-hold event, and a drag event can be sensed to initiate differing responses. For example, a page back event can be received in the form of a flipping motion (i.e. a short stroke) across the second hot spot portion 178.

Figure 5:
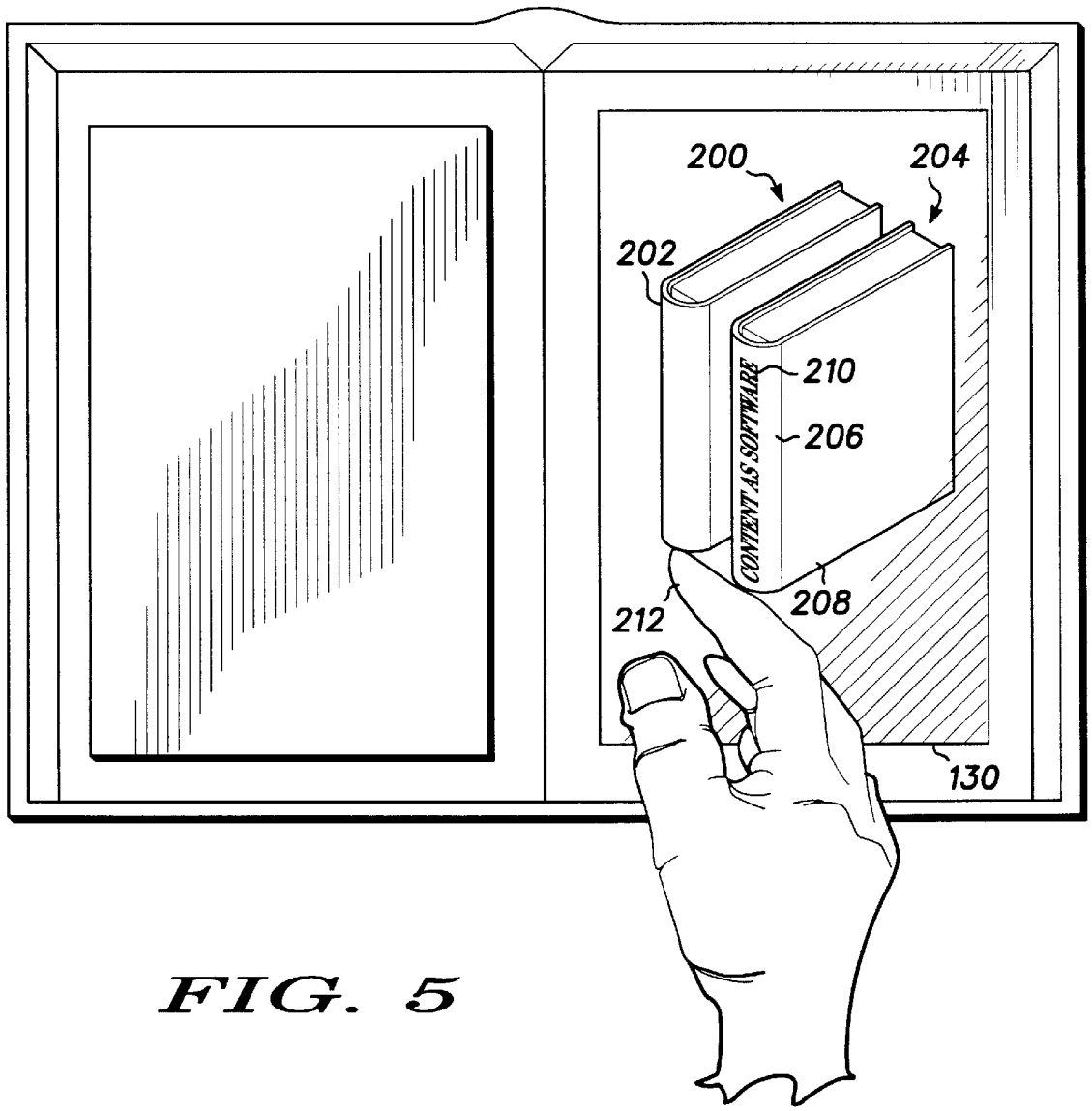
FIG. 5 is an illustration of a library screen display using an embodiment of the electronic book.

FIG. 5 is an illustration of a library screen displayed using an embodiment of the electronic book. In a preferred embodiment, the library screen is displayed upon opening the electronic book or activating the electronic book. The library screen includes a rearward graphical book representation 200 having a graphical spine portion 202. A forward graphical book representation 204 is displayed in front of the rearward graphical book representation 200. The forward graphical book representation 204 has a graphical spine portion 206 and a graphical front cover portion 208. A title 210 of a book currently being read is displayed on the forward graphical book representation 204. In the embodiment illustrated in FIG. 5, the title 210 is displayed on the graphical spine portion 206 of the forward graphical book representation 204.

Upon receiving a user-initiated event in which a portion of the rearward graphical book representation 200 is selected, a title of another book or books of a plurality of books in a library is displayed in place of the title 210 on the forward graphical book representation 204. In a preferred embodiment, the portion of the rearward graphical book representation 200 selected in this user-initiated event is within the graphical spine portion 202.

The titles of the books in the library can be obtained from a storage medium (which contains the books) installed in the electronic book. Alternatively, the titles of the books can be obtained by a connection to an information service providing books or other information in real time. As another alternative, the titles and the books can be accessed on demand from a world-wide web page.

A user can scroll through the library of books by repeatedly touching the spine portion 202 with his or her finger 212 until a desired book title is pulled into view. When the spine portion 202 is selected for a last of the plurality of books, the title of the first book is displayed. In this manner, the user can rotate through the library of books until a desired book is in front.

Figure 6:
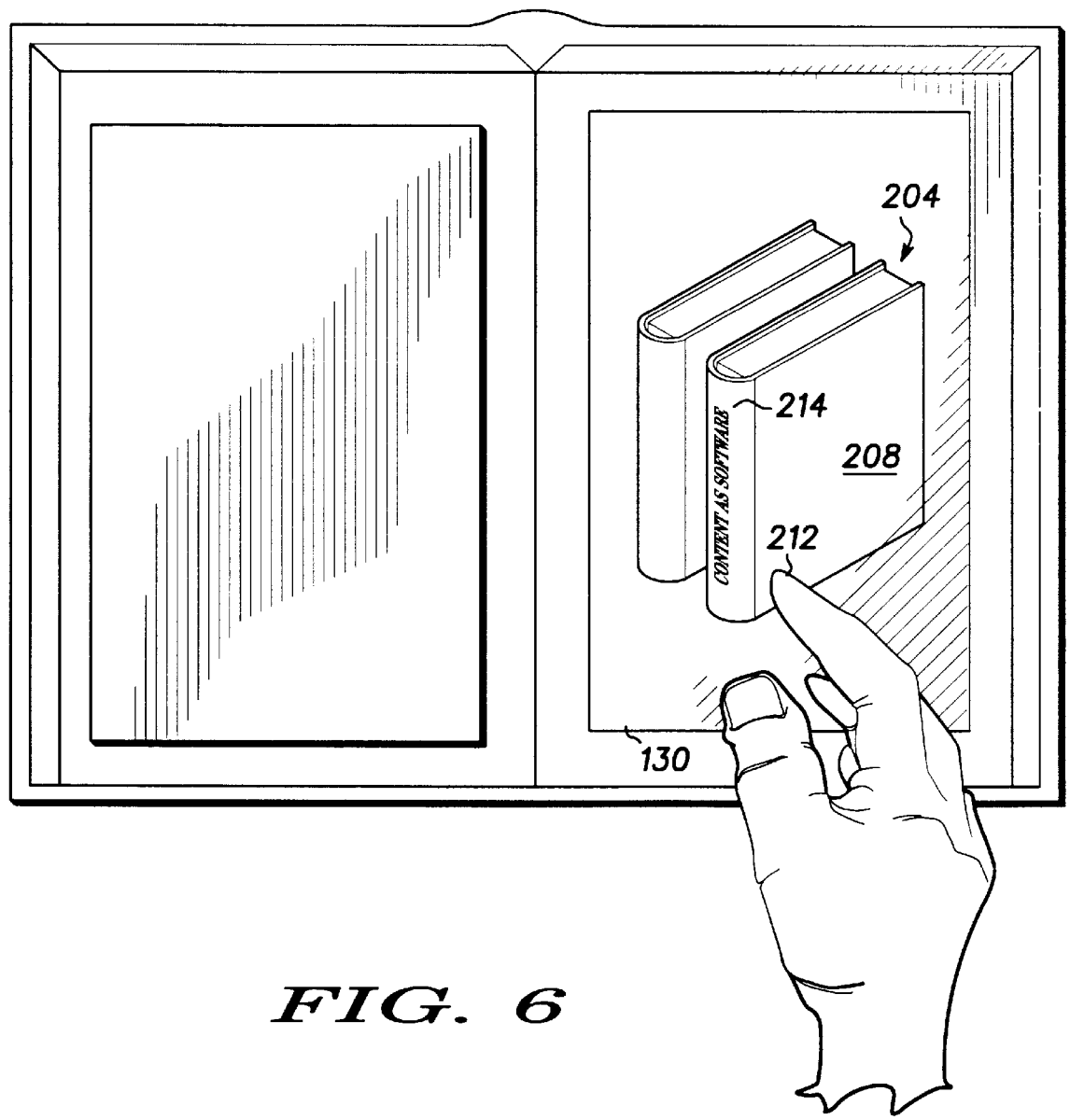
FIG. 6 is an illustration of a user-initiated event to open the desired book from the library screen.

FIG. 6 is an illustration of a user-initiated event to open the desired book from the library screen. The forward book is opened upon receiving a user-initiated event in which a portion of the forward graphical book representation 204 is selected. This user-initiated event can include, for example, the user touching the front cover portion 208 of the forward graphical book representation 204 using his or her finger 212. In response to this user-initiated event, the book indicated by a title 214 is opened. If the book is previously unread, the book is opened to page one. If the book has been read before, the book opens to a page which was last read.

Figure 7:
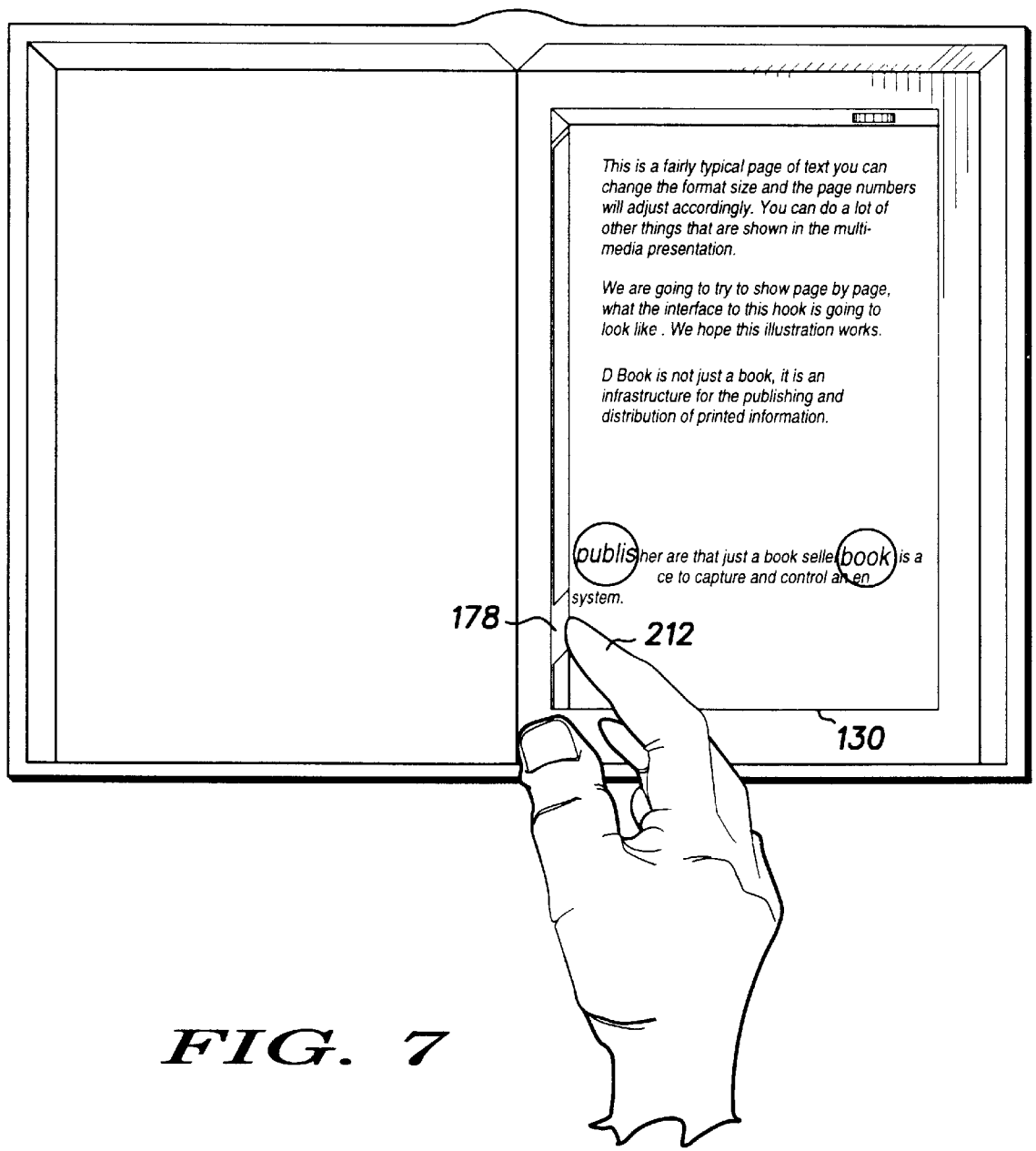
FIG. 7 is an illustration of a first page of a book displayed on an embodiment of the electronic book.

FIG. 7 is an illustration of a first page of a book displayed on the touchscreen 130 upon exiting the library screen. To display the first page of the book, the machine-readable data representative of text and graphics from the book is read from either the removable machine-readable storage medium 136 installed in the electronic book, or from the internal machine-readable storage medium 154. Upon reading the machine-readable data, a page of the text and/or the graphics is then displayed on the touchscreen 130. As shown, the text is displayed to appear as a standard page in a real book.

If a user-initiated event is received in which a user selects the second hot spot portion 178, i.e. the page back portion, of the touchscreen 130 when the book is on the first page, then a title page containing system controls is displayed.

Figure 8:
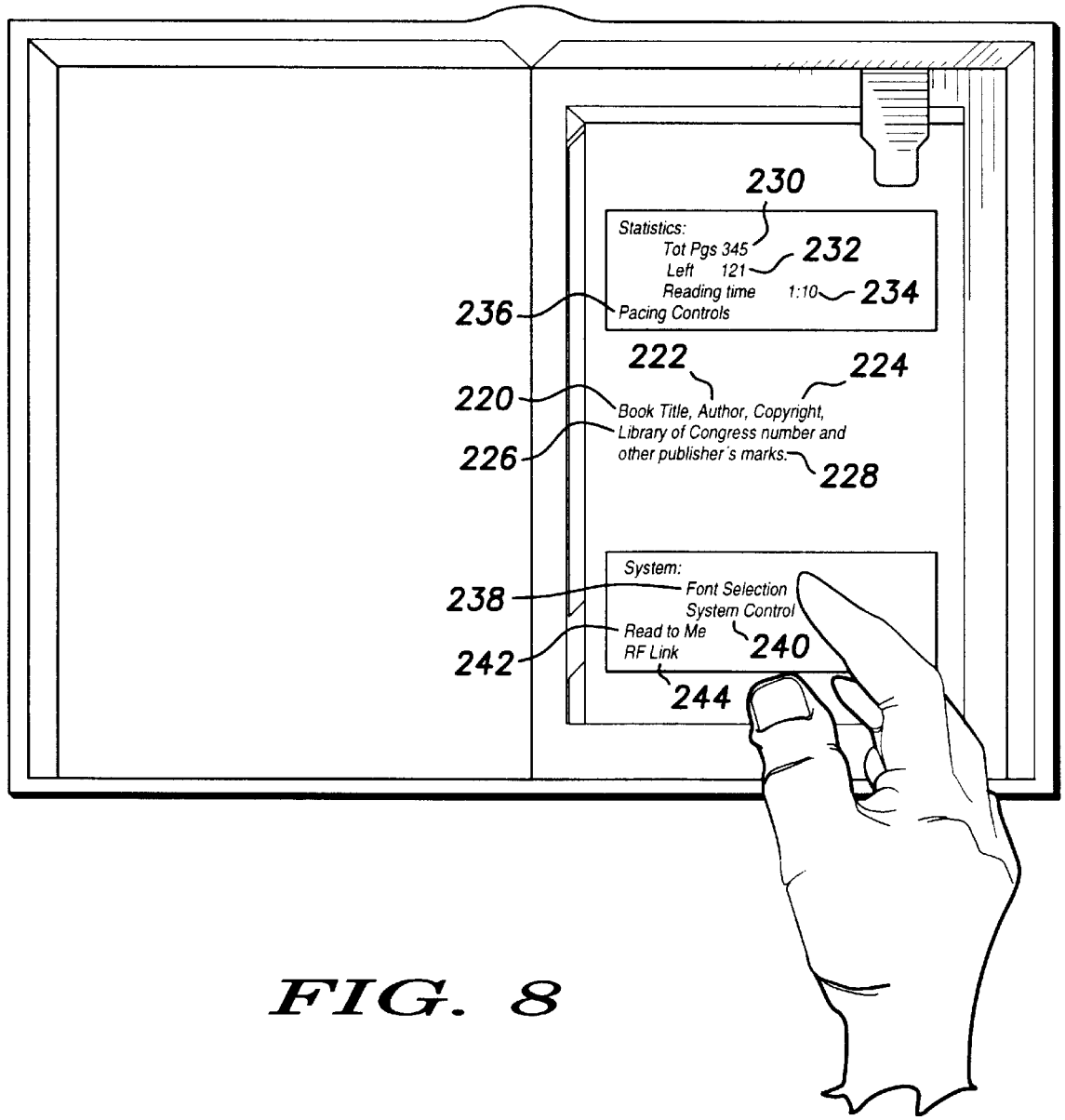
FIG. 8 is an illustration of a title page of a book displayed on an embodiment of the electronic book.

FIG. 8 is an illustration of a title page of a book displayed on an embodiment of the electronic book. Information which is displayed on the title page includes a book title 220, author information 222, copyright information 224, a Library of Congress number 226, and publisher information 228. Also displayed are statistics such as a total number of pages 230 in the book, a number of pages left to be read 232, and an elapsed reading time 234.

A number of control options are also displayed. These control options include, but are not limited to, a pacing control option 236, a font selection option 238, a system control option 240, a read-to-me option 242, and a radio frequency (RF) link option 244. Any of these control options can be initiated by a respective user-initiated event indicative of a user selecting the option. As illustrated in FIG. 8, a user is initiating a font selection routine by touching the font selection option 238 using his or her finger 212.

Figure 9:
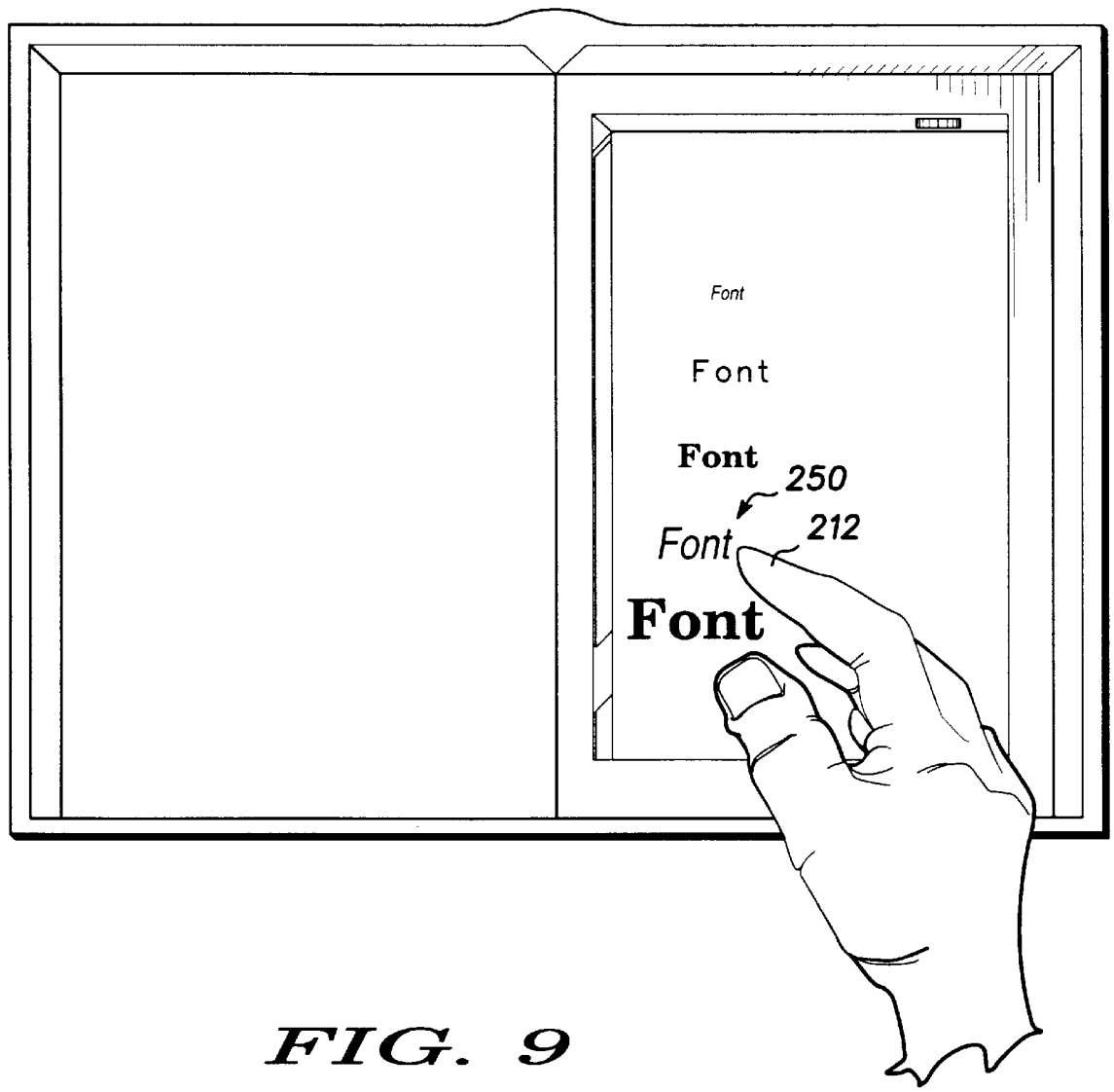
FIG. 9 is an illustration of a font selection page displayed on an embodiment of the electronic book.

FIG. 9 is an illustration of a font selection page displayed on an embodiment of the electronic book. The font selection page is displayed upon an initiation of the font selection routine.

Displayed on the font selection page are a number of font/size combination options. Each option is in the form of a word displayed using a specific font and a specific size in accordance with the font/size combination. A user selects a desired font/size combination by viewing how words appear in the various combinations, and selecting the combination which is desired. For example, in FIG. 9, the user is selecting a desired font/size combination by selecting a word 250 displayed in the desired font/size combination using his or her finger 212.

The fonts can be selected from internal fonts and custom fonts provided on the medium provided by a publisher. For example, a user may select a Gothic font provided on a medium containing a Shakespeare work instead of default fonts (e.g. Courier, Helvetica, Avant Garde) within the electronic book.

Upon selecting the desired font/size combination, the electronic book automatically flips back to the title page containing the system controls. Thereafter, the electronic book uses the desired font/size combination as a primary font/size combination to display the text of the book. Titles and headings in the book are enlarged and bolded based upon the primary font/size combination. Other portions of text can be italicized based on the primary font. However, it is preferred that the body of the text never be displayed smaller than the size selected in the primary font/size combination. In some embodiments, it may be preferred to display footnotes in a size smaller than the size selected.

Figure 10:
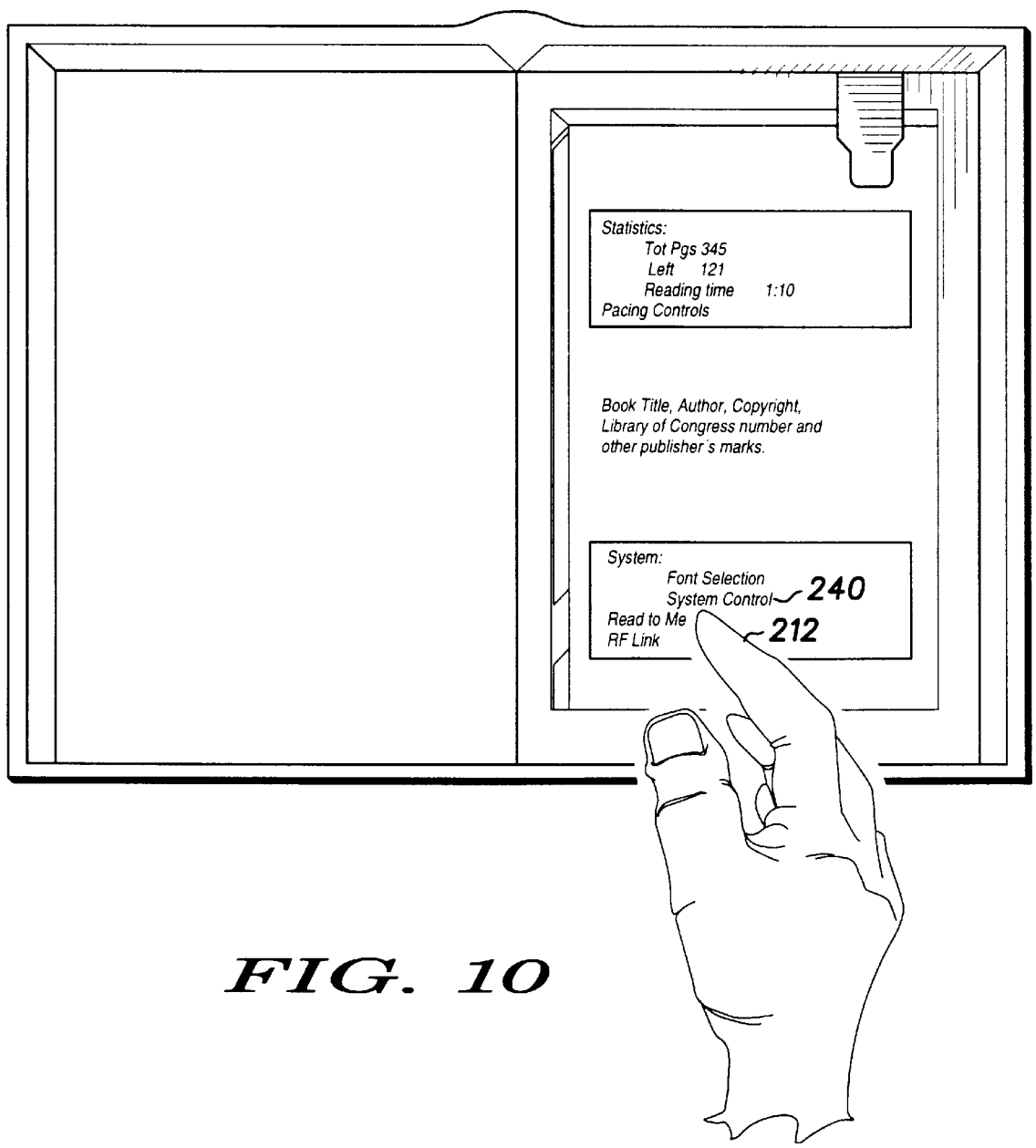
FIG. 10 is an illustration of the title page of the book which is displayed upon exiting the font selection page.

FIG. 10 is an illustration of the title page of the book which is displayed upon exiting the font selection page. Here, a user is shown to initiate a system control routine by selecting the system controls option 240 using his or her finger 212.

Figure 11:
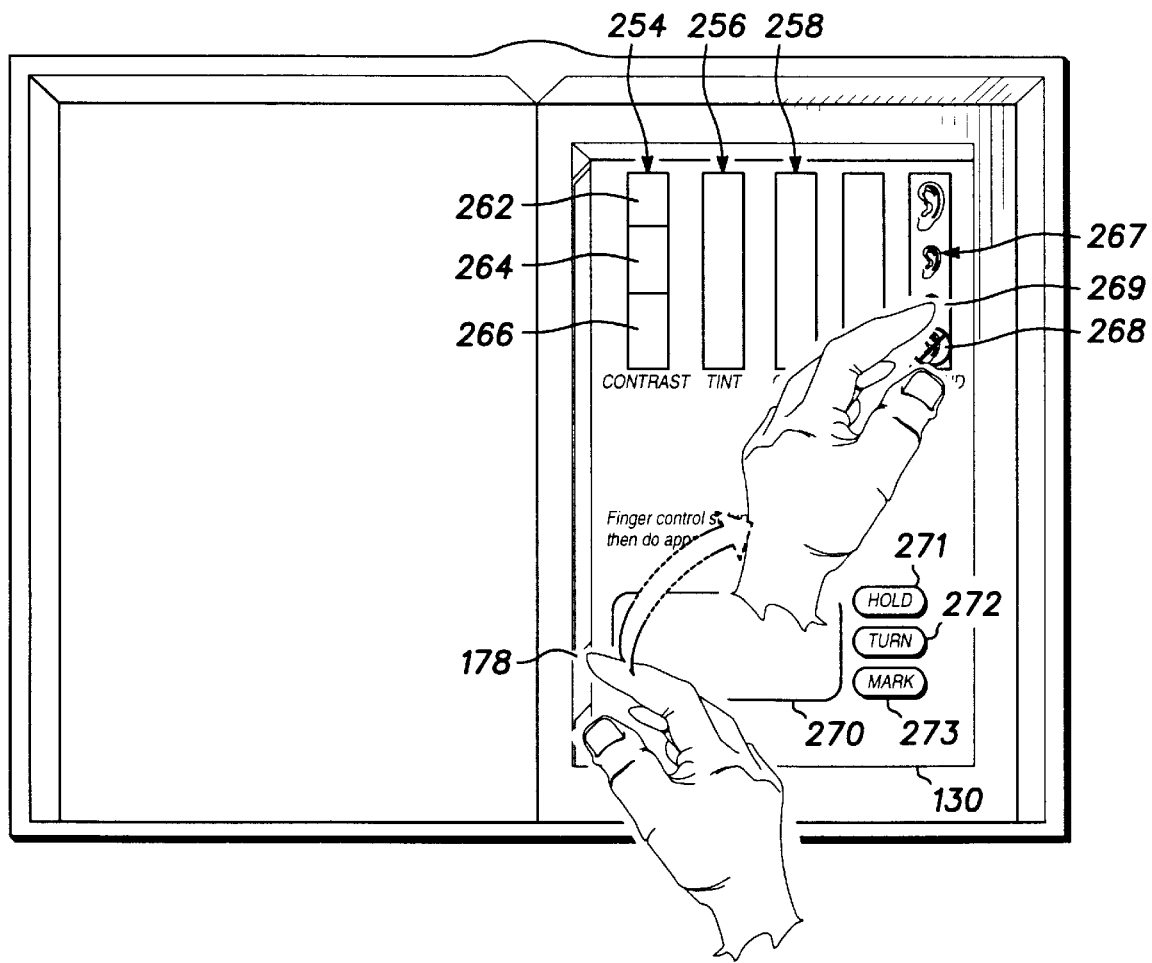
FIG. 11 is an illustration of a system control page displayed in an embodiment of the electronic book.

FIG. 11 is an illustration of a system control page displayed in an embodiment of the electronic book. The system control page is displayed upon executing the system control routine.

The system control page provides a number of display controls including a contrast control 254, a tint control 256, and a color control 258. Each of these controls provides a discrete number of control values which can be directly selected by a user. Further, each control value is displayed in a graphical manner consistent with the result of its selection. For example, the contrast control 254 includes a high contrast graphical representation 262, an intermediate contrast graphical representation 264, and a low contrast graphical representation 266. The graphical representations 262, 264, and 266 are of the same graphical image, but are displayed using different contrast control values. Hence, a user can visually determine a desired contrast by viewing the graphical representations 262, 264 and 266. In a similar manner, the tint control 256 and the color control 258 each display a predetermined graphical image using a discrete number of tint control values and color control values, respectively.

Preferably, the display of the graphical representations within the display controls are unaffected by current values of selected ones of the controls. In one preferred embodiment, the display of the graphical representations is independent of all of the current values. For example, the display of the low contrast representation 266 can be independent of the current contrast control value, the current tint control value, and the current color control value. In another preferred embodiment, the display of the graphical representations in each control is independent of the current value of that control, but depend on the current value of the other controls. Here, for example, the display of the low contrast representation 266 is independent of the current contrast control value, but dependent upon the current tint control value and the current color control value. Using either of these two embodiments, a user can immediately determine a result of each control value selection before actually performing the selection.

The system control page also includes a sound control 267. The sound control 267 is illustrated to have a discrete number of sound intensity values which can be selected by a user. In the embodiment of FIG. 11, the sound intensity values are monotonically related to the size of an ear displayed on the sound control 267. An ear 268 having a slash therethrough is indicative of an option to turn off the sound. For the purpose of illustration, FIG. 11 shows a user selecting an intermediate sound intensity by touching an ear graphic 269. The user then returns to the system control page by touching the second hot spot portion 178, i.e. the page back hot spot, of the touchscreen 130.

It is noted that the controls on the system control page can provide continuous, rather than discrete, control of the control values in alternative embodiments of the electronic book. Here, for example, the ear size and the volume can increase or decrease based on finger selection movement.

A pad area 270 of the system control page is utilized for testing motions such as a hold event, a turn event, and a mark event. In particular, a user can point to any of a hold selection 271, a turn selection 272, and a mark selection 273, and then perform the selected motion in the pad area 270. Here, a length of hold time or style of dragging a finger for a flip command can be gauged for each user, for example, using the pad area 270.

Figure 12:
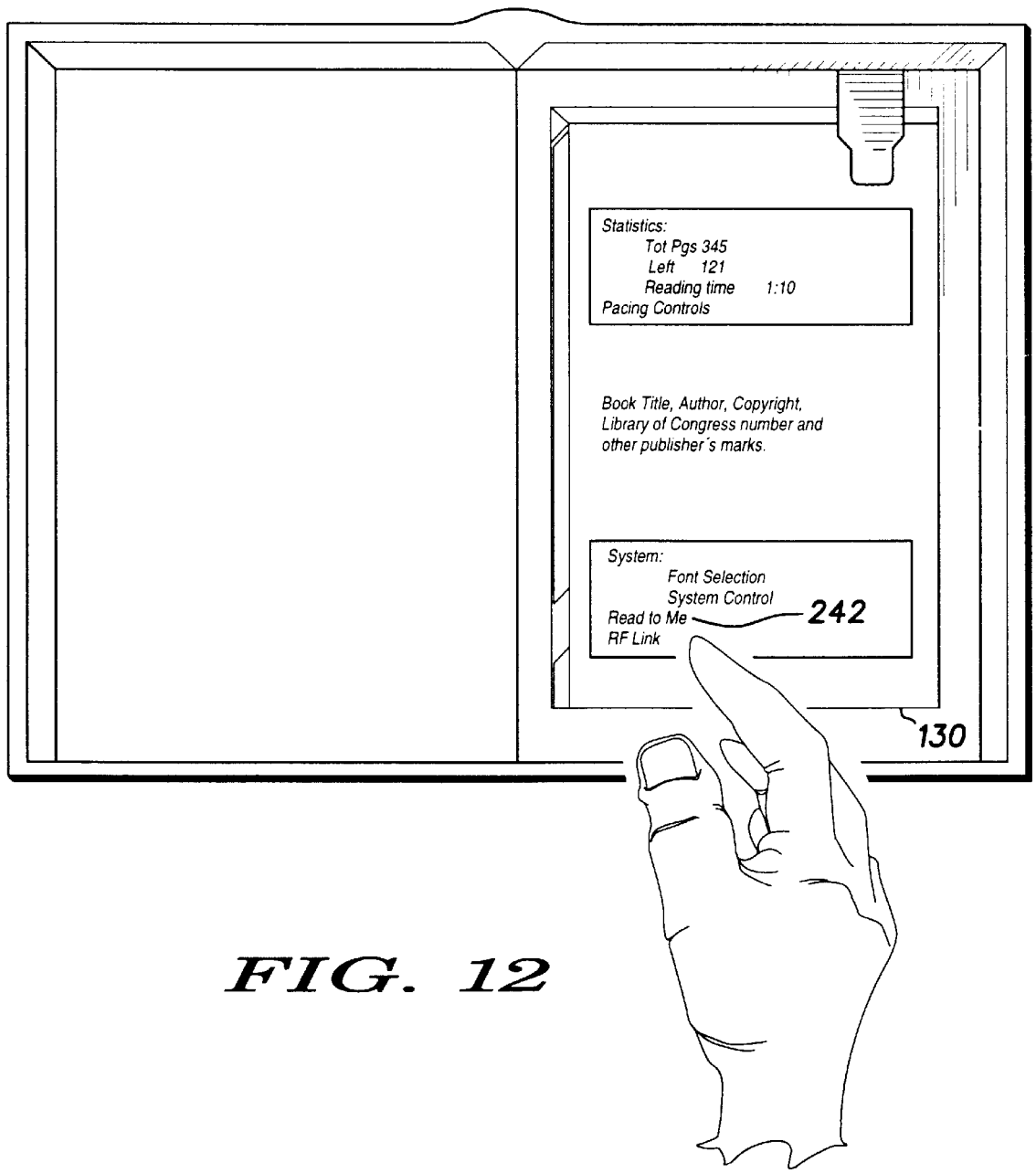
FIG. 12 is an illustration of the title page of the book which is displayed upon exiting the system control page.

FIG. 12 is an illustration of the title page of the book which is displayed upon exiting the system control page. Here, the user is illustrated to select the read-to-me option 244 which initiates the voice synthesizer 162 to audibly read the text being visually displayed on the touchscreen 130. The audible reading of the text begins at the last page which was displayed on the touchscreen 130. The reading rate and other controls for the read-to-me routine is provided on a pacing control page described hereinafter.

Figure 13:
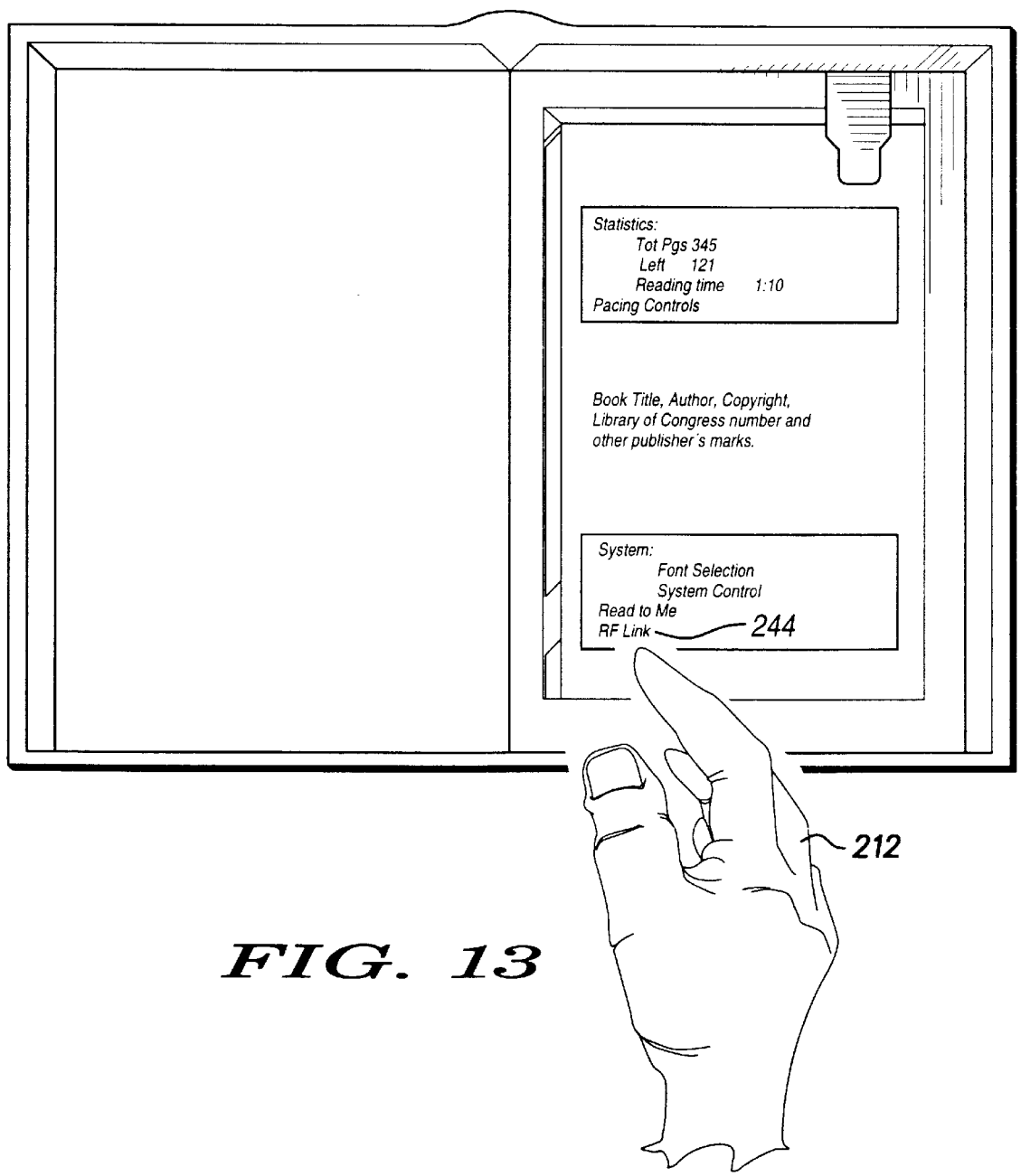
FIG. 13 is an illustration of the title page of the book wherein a radio frequency link option is selected.

FIG. 13 is an illustration of the title page of the book wherein a radio frequency link option is selected. This option is selected by the user by touching the RF link option 244 using his or her finger 212. Upon selecting the RF link option 244, an RF link routine is executed. The RF link routine allows the user to download updates of the text to the electronic book, and/or to interface the electronic book to a personal computer or communication unit. The RF link routine utilizes the antenna 158 and the RF modem 160 illustrated in FIG. 3 to communicate with the personal computer using a local wireless link, or more generally to communicate with a wireless data communication network. Utilizing a nationwide wireless data communication network, such as the Ardis network, allows individuals to receive book updates via radio frequency links in major cities.

Figure 14:
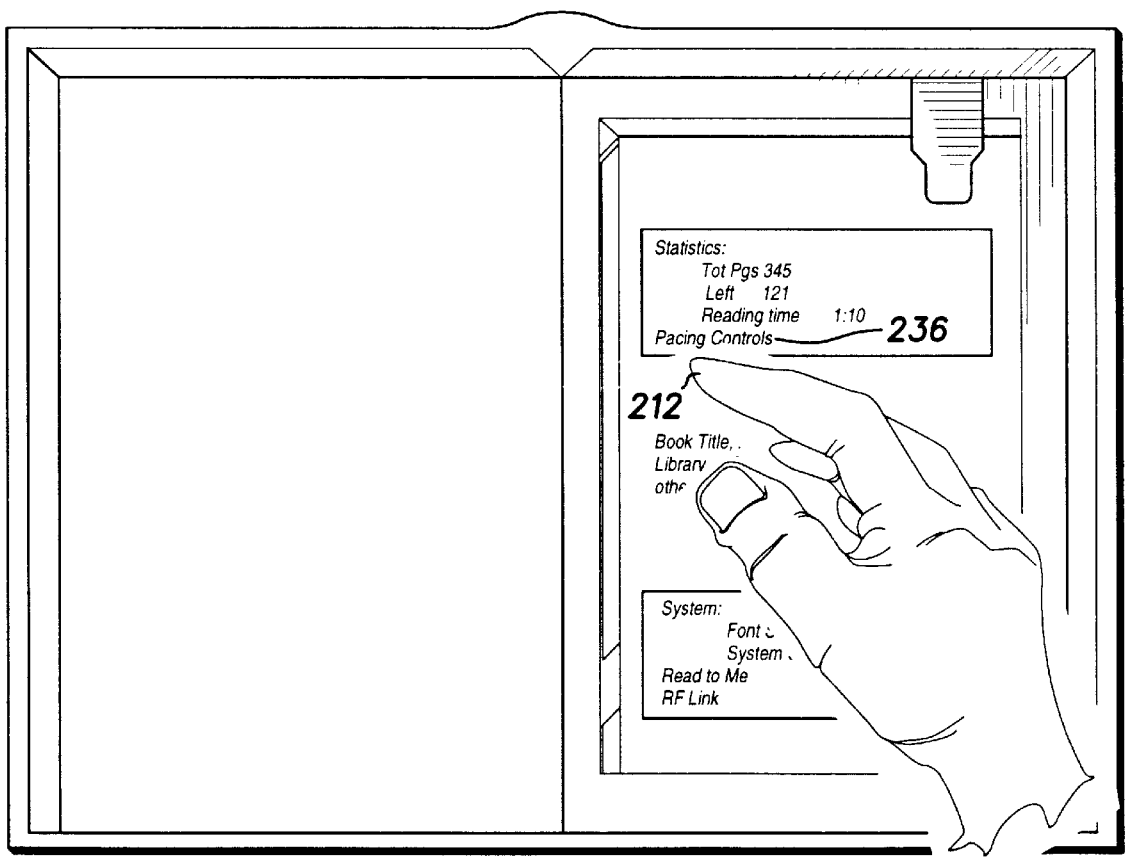
FIG. 14 is an illustration of the title page of the book wherein a pacing control option is selected by a user.

FIG. 14 is an illustration of the title page of the book wherein a pacing control option is selected by a user. Specifically, the user is shown to initiate a pacing control routine by selecting the pacing control option 236 displayed on the title page using his or her finger 212.

Figure 15:
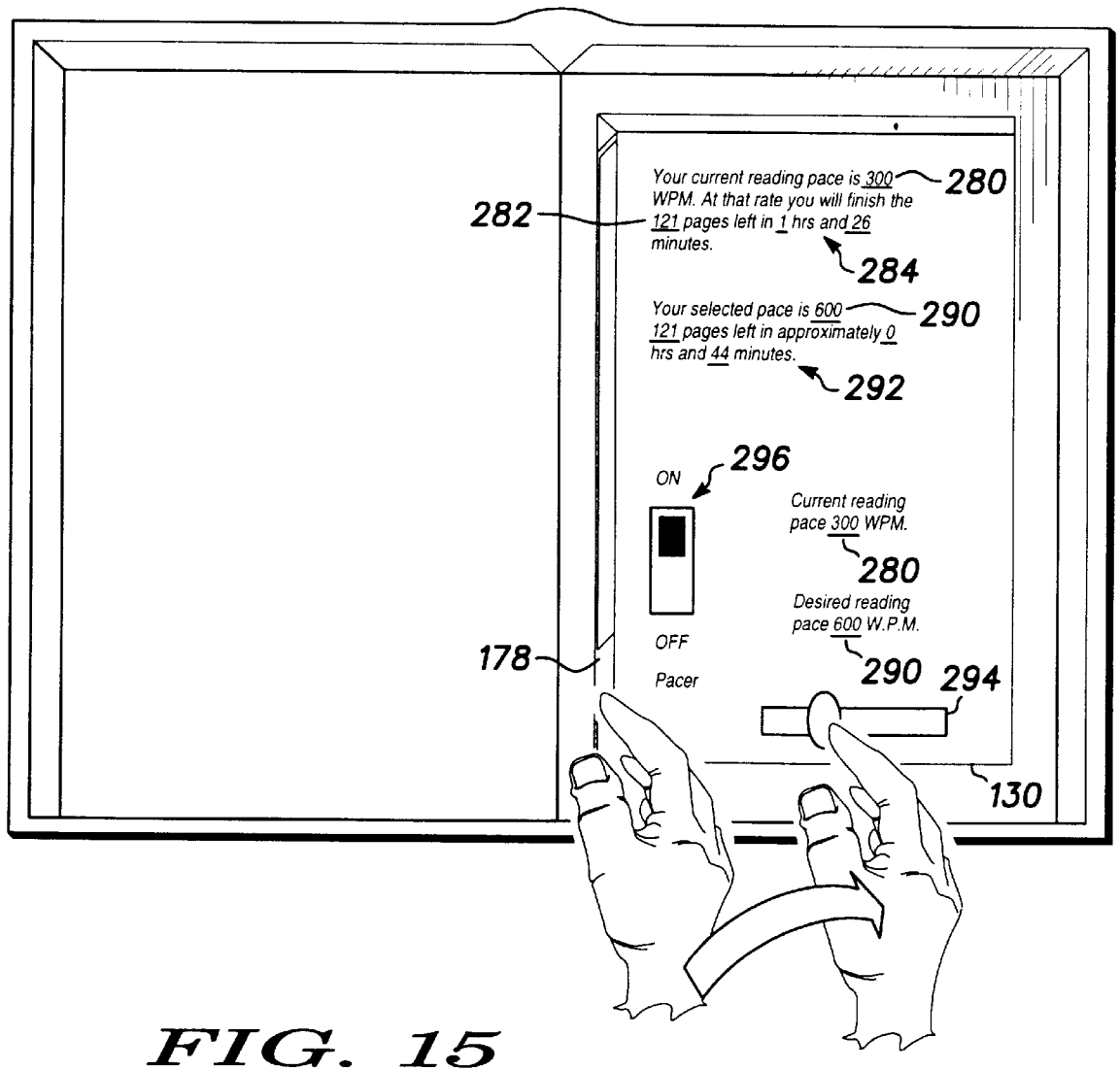
FIG. 15 is an illustration of a pacing control page displayed in an embodiment of the electronic book.

FIG. 15 is an illustration of a pacing control page displayed in an embodiment of the electronic book. The pacing control page is displayed once the user selects the pacing control option 236 from the title page. The pacing control page includes a display 280 of a current reading pace of the user. Based upon the number of pages left in the book, which is given in a display 282, a display 284 of an estimated completion time for the book is also given. In the embodiment of FIG. 15, the current reading pace, the number of pages left, and the estimated completion time are displayed in the form of one or more sentences.

Also displayed on the pacing control page is a display 290 of a desired reading pace. A display 292 of an estimated completion time in accordance with the desired reading pace is also given. The desired reading pace is controlled by the user using a graphical slider bar 294. The pages of the text in the book are automatically paced by a pacing routine which is enabled and disabled by a graphical switch 296. In one embodiment, each page of text is displayed for a duration commensurate with the desired reading rate controlled by the graphical slider bar 294. The user returns to the title page from the pacing control page by selecting the second hot spot portion 178, i.e. the page back portion, of the touchscreen 130.

Figure 16:
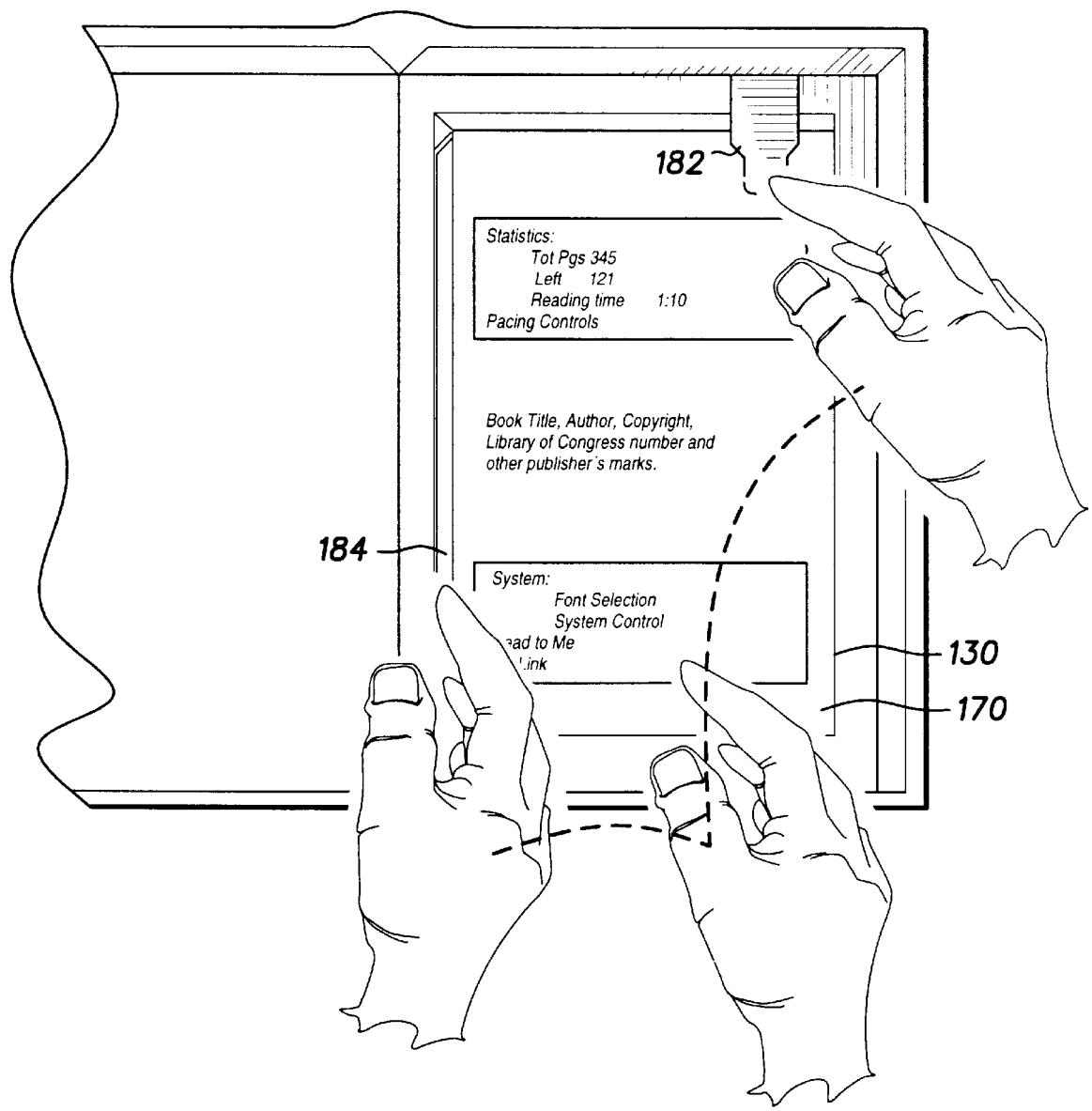
FIG. 16 is an illustration of the title page of the book which depicts other user-initiated options.

FIG. 16 is an illustration of the title page of the book which depicts other user-initiated options. The user can return to a book-marked page by selecting the bookmark graphic 182. The user can return to the library screen by selecting the fourth hot spot portion 184, i.e. the close book portion, of the touchscreen 130. The user can go to the first page of the book by selecting the first hot spot portion 170, i.e. the advance page portion, of the touchscreen 130.

Figure 17:
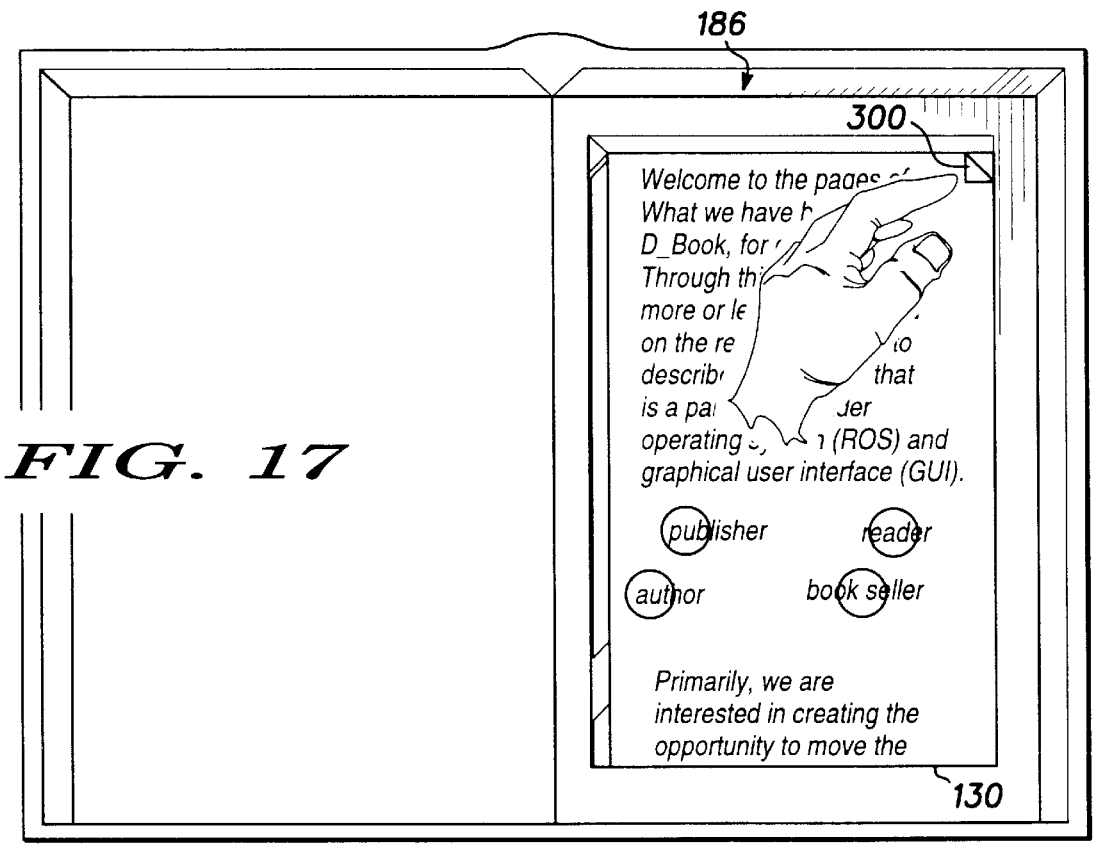
FIG. 17 is an illustration of a page marked by a dog ear for use in embodiments of the electronic book.

FIG. 17 is an illustration of a page marked by a dog ear in an embodiment of the electronic book. The user initiates a dog ear command by performing a predetermined user-initiated event. An example of such an event includes a user touching an upper corner portion of the touchscreen 130, such as the fifth hot spot portion 186 defined earlier.

If the page is not dog-eared, then a brief touching of the upper corner portion 186 causes a dog ear graphic 300 to be displayed in the upper corner portion. In addition, an indication that this page has been dog-eared is stored either in the removable machine-readable storage medium 136 or the internal machine-readable storage medium 154.

If the user touches the upper corner portion 186 of a page already marked with a dog ear, or if the upper corner portion 186 is held for a duration greater than a predetermined threshold, then a dog ear dialog box is opened.

Figure 18:
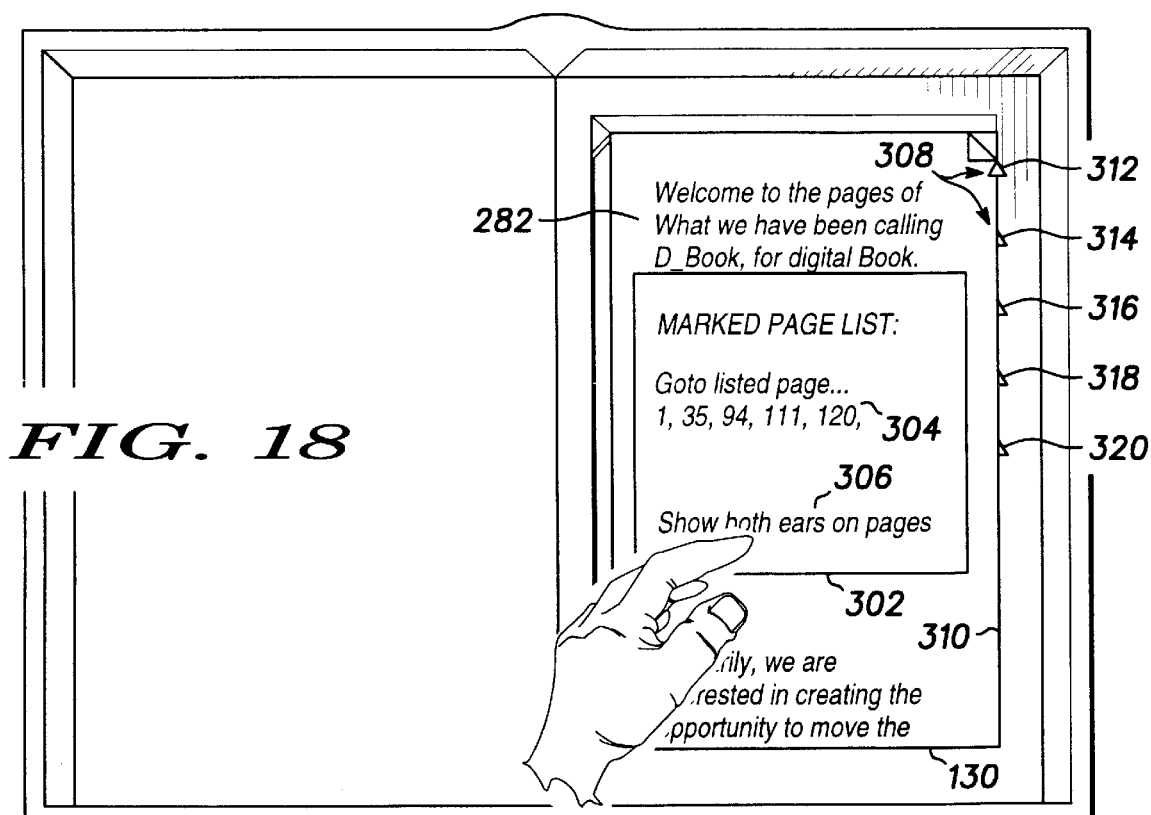
FIG. 18 is an illustration of a dog ear dialog box used in embodiments of the electronic book.

FIG. 18 is an illustration of a dog ear dialog box used in embodiments of the electronic book. A dog ear dialog box 302 is displayed on touchscreen 130. The dog ear dialog box 302 displays a list 304 of all dog-eared pages. A user can immediately go to one of the dog-eared pages on the list 304 by touching a display of a selected page number.

The dog ear dialog box 302 also displays an option 306 to display marks 308 along an edge 310 of the page. Thereafter, a user can touch any of the marks 308 to move quickly to a corresponding one of the dog-eared pages. In the example illustrated in FIG. 18, a mark 312 corresponds to marked page 1, a dog ear 314 corresponds to marked page 35, a mark 316 corresponds to marked page 94, a mark 318 corresponds to marked page 111, and a mark 320 corresponds to marked page 120. In a preferred embodiment, page one is always marked with a dog ear so that a user can quickly return thereto using either the marks 308 or the dog ear dialog box 302.

Upon receiving a user-initiated event while the dog ear dialog box 302 is displayed, the dog ear dialog box 302 is removed to show the selected page of the book.

Figure 19:
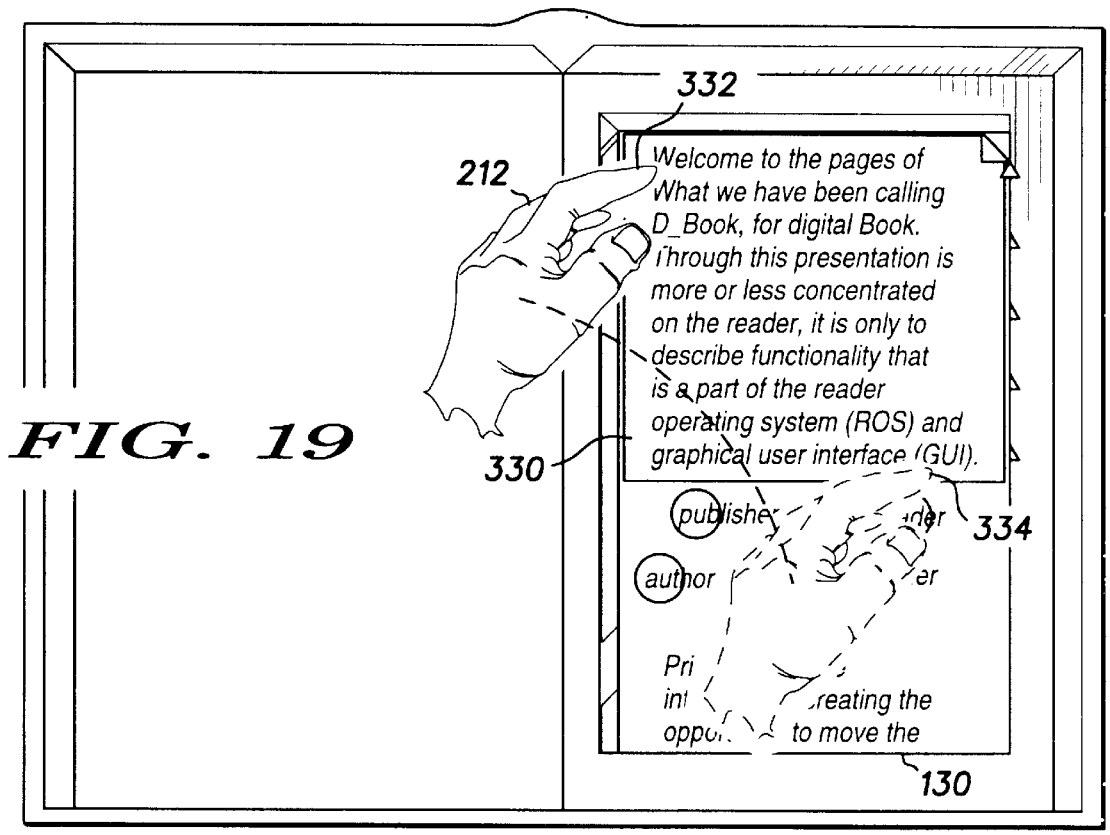
FIG. 19 is an illustration of a user selecting a portion of a page of text.

FIG. 19 is an illustration of a user selecting a portion of a page of text. A portion 330 is selected by a user-initiated event of sliding his finger 212 (or other pointing member such as a stylus) from a first position 332 to a second position 334. Upon its selection, the portion 330 of the text is highlighted in a predetermined manner. The portion 330 of the text can be highlighted in color if the touchscreen 130 is capable of a color display. Alternatively, the portion 330 of the text can be highlighted using grey scale shading, reverse video, or underlining. An option selection dialog box is then displayed on the touchscreen 130 to provide the user a number of text marking options.

Figure 20:
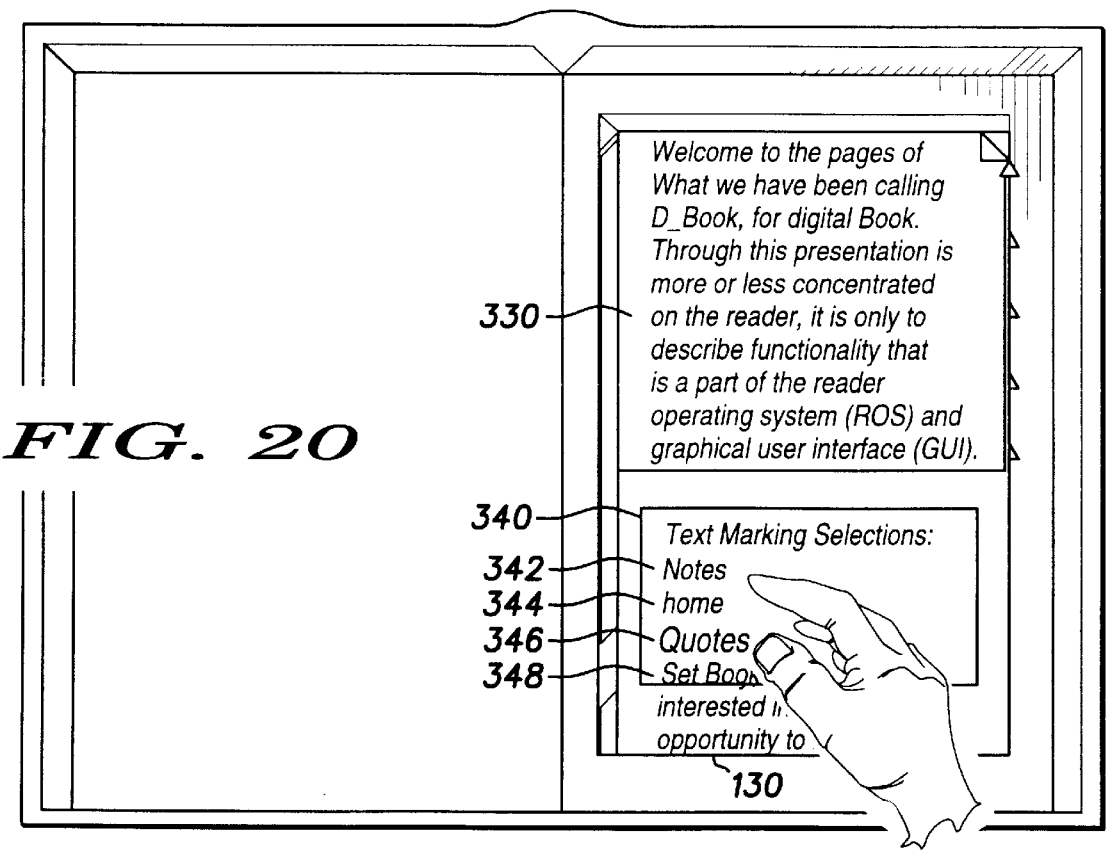
FIG. 20 is an illustration of an option selection dialog box used in embodiments of the electronic book.

FIG. 20 is an illustration of an option selection dialog box used in embodiments of the electronic book. An option selection dialog box 340 is displayed on the touchscreen 130 in a location out of the way of the portion 330 of the text that is marked when possible. The option selection dialog box 340 includes a plurality of text marking options including a note capture option 342, a highlighting option 344, a quote capture option 346, and a set bookmark option 348.

Briefly, the note capture option 342 allows a user to type in notes associated with the portion 330 of the text. The highlighting option 344 leaves the portion 330 of the text highlighted, and stores an indication of this highlighting so that any subsequent return to this page displays the portion 330 as being highlighted. The quote capture option 346 allows a user to store the portion 330 of the text along with source data, such as the name of the author of the book or the title of the book, in the internal machine-readable storage medium 154. The set bookmark option 348 can be selected to add a bookmark to the current page. If the page already has a bookmark, then a number of bookmark management options similar to options used for the dog ear command are provided to the user.

Figure 21:
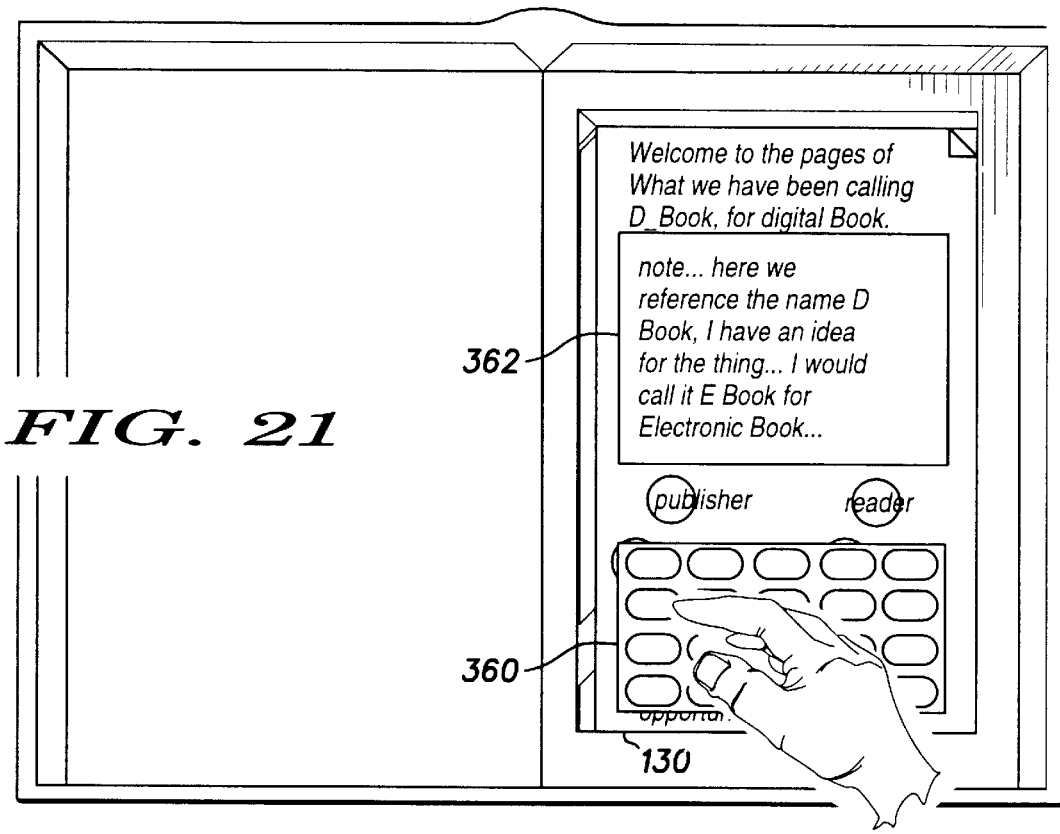
FIG. 21 is an illustration of an annotation display used in embodiments of the electronic book.

FIG. 21 is an illustration of an annotation display used in embodiments of the electronic book. The annotation display is provided in response to a user selecting the note capture option 342 illustrated in FIG. 20. After receiving a user-initiated event indicative of selecting the note capture option 342, a soft keyboard 360 is displayed on the touchscreen 130. The soft keyboard 360 includes alphanumeric keys and symbolic keys along with a close key and a notes collection key.

A plurality of keystroke events are received by the soft keyboard 360 to form an annotation. As the keystroke events are received, a plurality of characters corresponding thereto are displayed in a window 362 on the touchscreen 130.

The user selects the close key on the soft keyboard 360 upon completing the annotation. In response to selecting the close key, the electronic book removes the soft keyboard 360 and the window 362 from the touchscreen 130 and displays a note marker icon to indicate that the page has an annotation associated therewith.

The notes collection key on the soft keyboard 360 commands the electronic book to communicate the annotation to an external device such as a personal computer. The personal computer can be interfaced to the electronic book either wirelessly via the antenna 158 and the radio frequency modem 160 shown in FIG. 3, using a wire-based connection via the data interface 156, or using an infrared link.

An annotation can also be in the form of an image of pixels which overlays the page of the text. The pixels can be drawn on the touchscreen 130 using a pointing device. The pixels can be stored in a pixel-map form for subsequent viewing or for subsequent conversion to text using a handwriting recognition method.

As another option, an accessory keyboard can be added to the electronic book to enter the annotation as well as other information.

Figure 22:
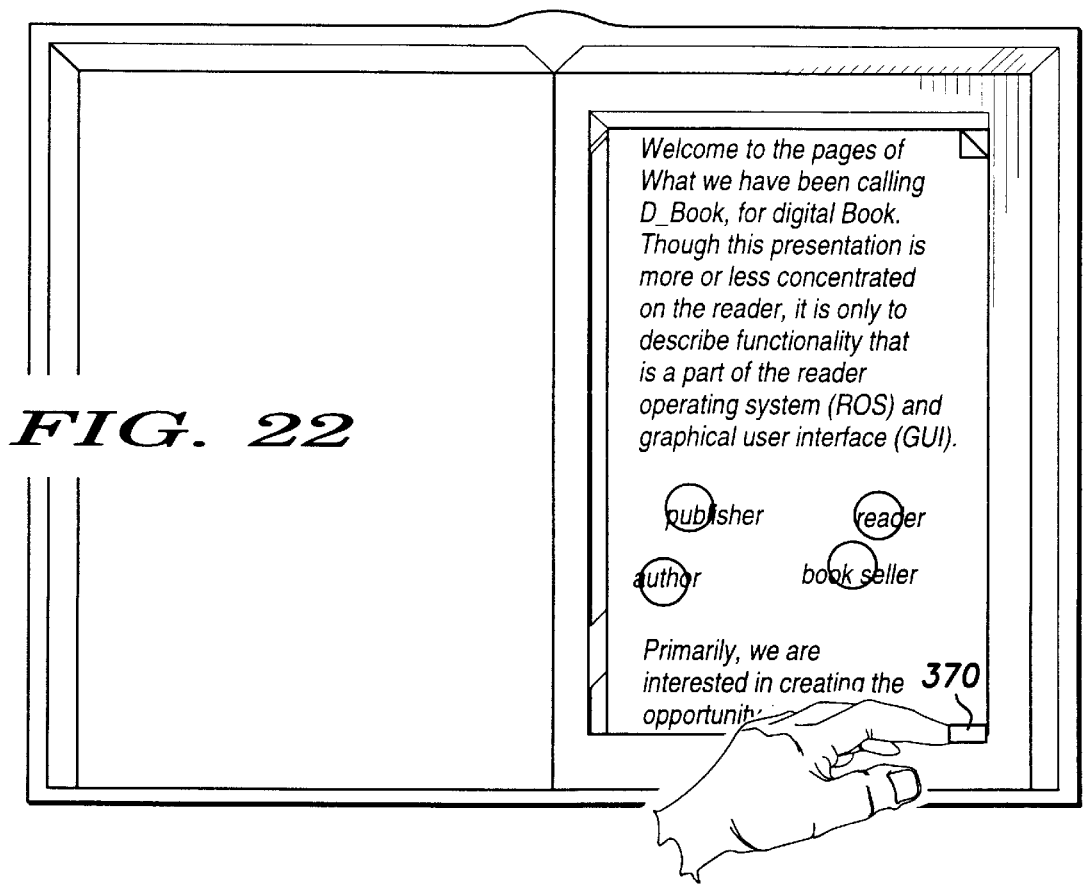
FIG. 22 is an illustration of a marker used to indicate that a page has an annotation associated therewith.

FIG. 22 is an illustration of a marker used to indicate that a page has an annotation associated therewith. The page illustrated in FIG. 22 results after the user enters the annotation and selects the close key from the soft keyboard 360 as illustrated in FIG. 21. As shown, the page in FIG. 22 no longer has the soft keyboard 360 and the window 362 displayed thereon. However, a note marker icon 370 is displayed in a lower corner of the page. The user can view the annotation associated with this page by selecting the note marker icon 370. Selecting the note marker icon 370 has the same effect as selecting the note capture option 342 as shown in FIG. 20.

Further, an annotation can be indicated by underlining or highlighting the portion of the text associated with the annotation. The annotation can be viewed in a hypertext-type manner by selecting the portion of text.

Figure 23:
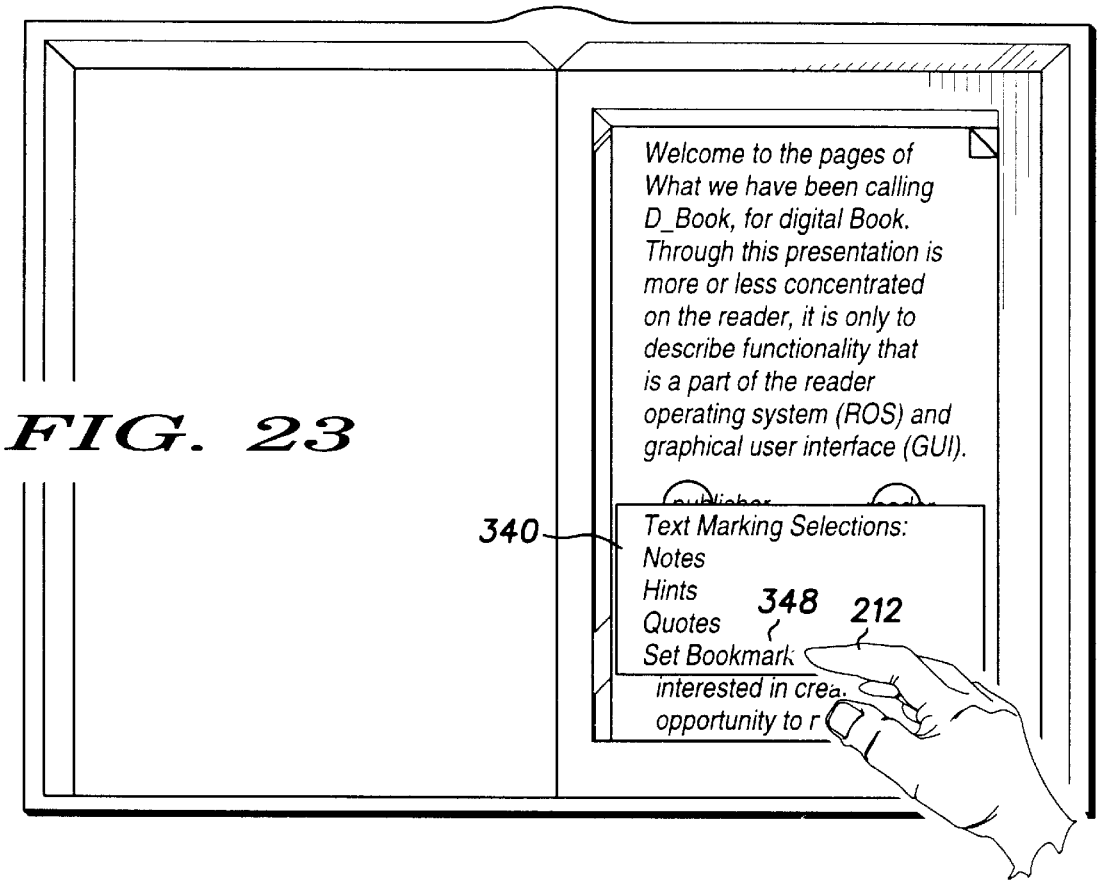
FIG. 23 is an illustration of a user selecting a set bookmark option in the option selection dialog box.

FIG. 23 is an illustration of a user selecting a set bookmark option in the option selection dialog box. The user selects the set bookmark option 348 by touching the displayed text associated therewith using his or her finger 212 or other pointing member. If this page had already included a bookmark, then a bookmark management dialog box is displayed similar to the one used for the dog ear command. Since the page illustrated in FIG. 23 does not have a bookmark associated therewith, the selection of the set bookmark option 348 causes a bookmark to be added to the page. In a preferred embodiment, only one page is bookmarked within each book.

Figure 24:
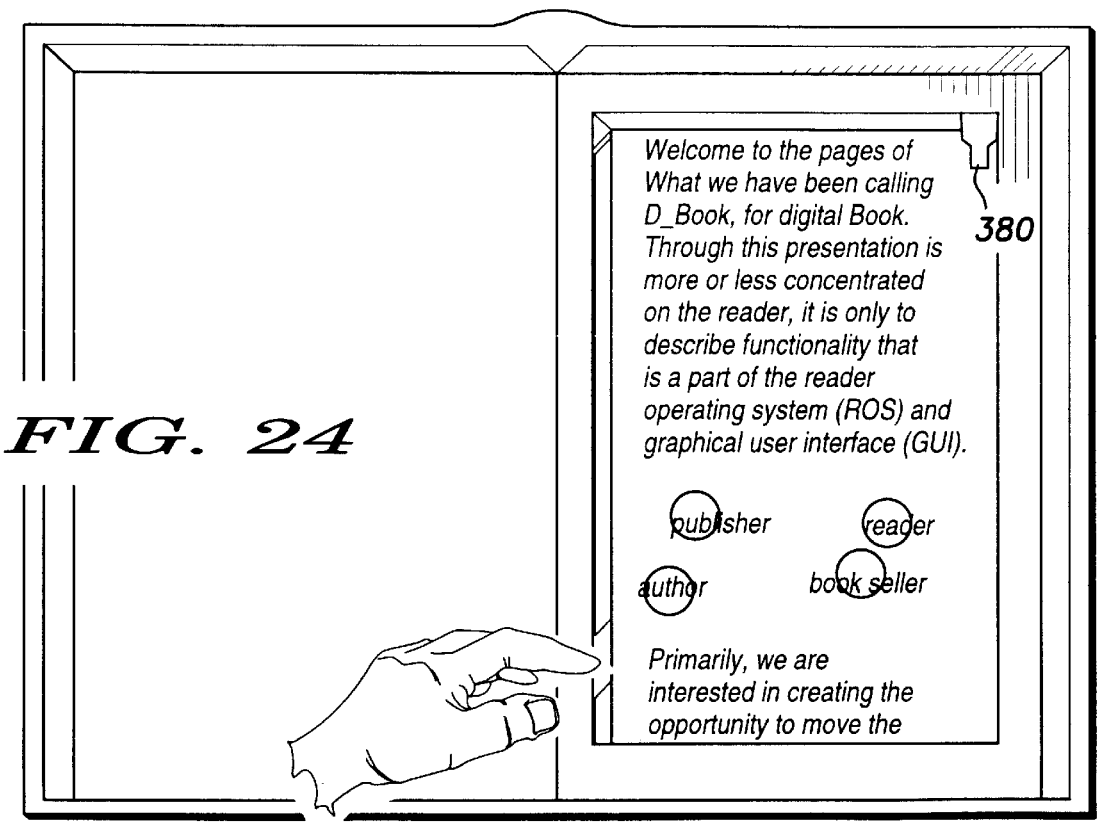
FIG. 24 is an illustration of the page of FIG. 23 having a bookmark displayed thereon.

FIG. 24 is an illustration of the page of FIG. 23 having a bookmark displayed thereon. A bookmark icon 380 is displayed in an upper portion of the page to indicate that the page has been bookmarked.

It is noted that pointing devices other than an individual's finger may be utilized to generate user-initiated events indicative of desired selections using the touchscreen 130. For example, a stylus or the like can be utilized to select desired portions of the touchscreen 130.

It is also noted that various types of graphical controls can be utilized to control settings and parameters of the electronic book. These graphical controls include, but are not limited to, graphical buttons, checkboxes, radio buttons, scroll bars, slider bars, pop-up menus, and dialog boxes.

Next, a description of steps which are performed by the various components of the electronic book to provide its features and functionality is presented. These operational steps are performed on or with the aid of the processor 152 illustrated in FIG. 3. The processor 152 is directed to function in a manner in accordance with these operational steps based upon a computer program or other form of software or firmware stored in a computer readable memory. The computer readable memory can be contained with the processor 152, within the internal machine-readable memory 154, or within a separate machine-readable storage medium in communication with the processor 152.

It is noted that the order in which the steps are described are indicative of one embodiment of the present invention, and that alternative embodiments of the present invention may perform the steps in a different order to achieve the same functionality.

Figure 25:
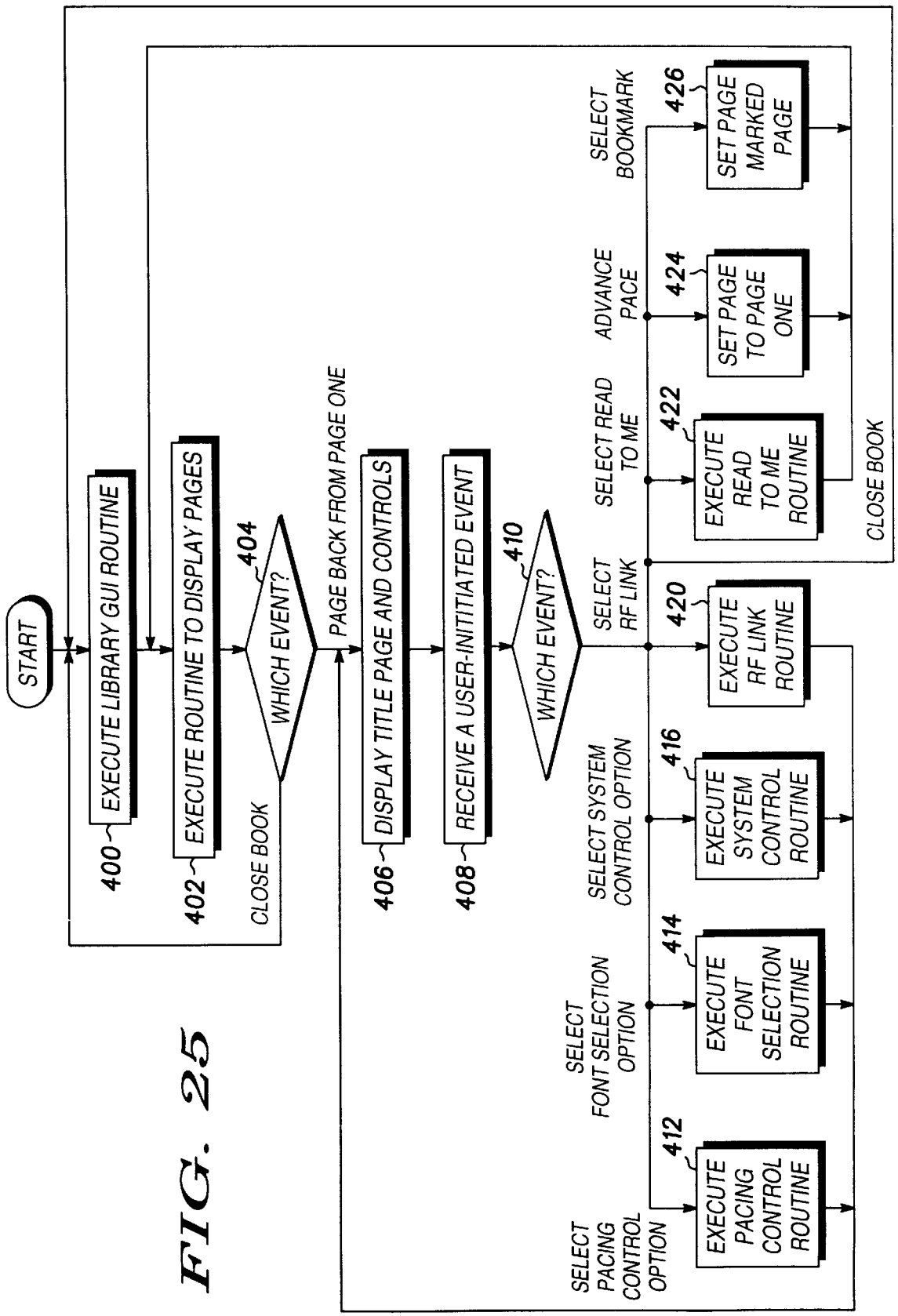
FIG. 25 is a flow diagram of an event loop performed in an embodiment of the electronic book.

FIG. 25 is a flow diagram of an event loop performed in an embodiment of the electronic book. As indicated by block 400, a step of executing a library graphical user interface routine is performed. The library graphical user interface routine provides a virtual library to allow a user to select a book to read from a plurality of books within a library, and/or access an information service or world-wide web page as previously described. The plurality of books can be contained in one or more removable machine-readable storage media and/or the internal machine-readable storage medium.

Upon selecting a desired book, a step of executing a routine to display one or more pages of text and graphics from the desired book is performed as indicated by block 402. The routine to display the pages of text is executed until a predetermined user-initiated event is received to exit the routine. As indicated by block 404, if a close book event is received, then flow of the event loop is directed back to the step of executing the library graphical user interface routine in block 400.

If a page back event is received when the current page of text being read is page one, then a step of displaying a title page of the book is performed as indicated by block 406. The title page provides a number of control options available to a user. The user selects a desired control option based upon a user-initiated event. Block 408 indicates a step of receiving this user-initiated event.

Based upon the user-initiated event which is received, flow of the event loop is directed to one of a number of subroutines in a step indicated by block 410. If the received event is indicative of the user selecting the pacing control option, then a step of executing a pacing control routine is performed as indicated by block 412. If the received event is indicative of the user selecting the font selection option, then a step of executing a font selection routine is performed as indicated by block 414. If the received event is indicative of the user selecting the system control option, then a step of executing a system control subroutine is performed as indicated by block 416. If the received event is indicative of the user selecting the RF link option, then a step of executing an RF link subroutine is performed as indicated by block 420. Upon completing either the pacing control subroutine, the font selection routine, the system control routine, or the RF link routine, flow of the event loop is directed back up to block 406 wherein the step of displaying the title page is performed.

If the received event from block 408 is indicative of the user selecting the read-to-me option, then a step of executing a read-to-me routine is performed as indicated by block 422. Flow of the event loop is then directed back to block 402 to execute the routine to display pages of text from the book. The execution of the read-to-me routine in block 422 provides a spoken, auditory display of the text in addition to the visual display of the text in block 402.

If the event received in the step of block 408 is an advance page event, then a step of setting the current page to page one is performed as indicated by block 424. If the received event is indicative of the user selecting a bookmark displayed on the title page, then a step of setting the current page to a previously bookmarked page is performed as indicated by block 426. After the current page is set in either of the steps indicated by blocks 424 and 426, then flow of the event loop is directed back to the step of executing the routine to display pages of text indicated by block 402.

Finally, if the event received in block 408 is indicative of a close book event, then flow of the event loop is directed back to block 400 to perform a step of executing the library graphical user interface routine.

Figure 26:
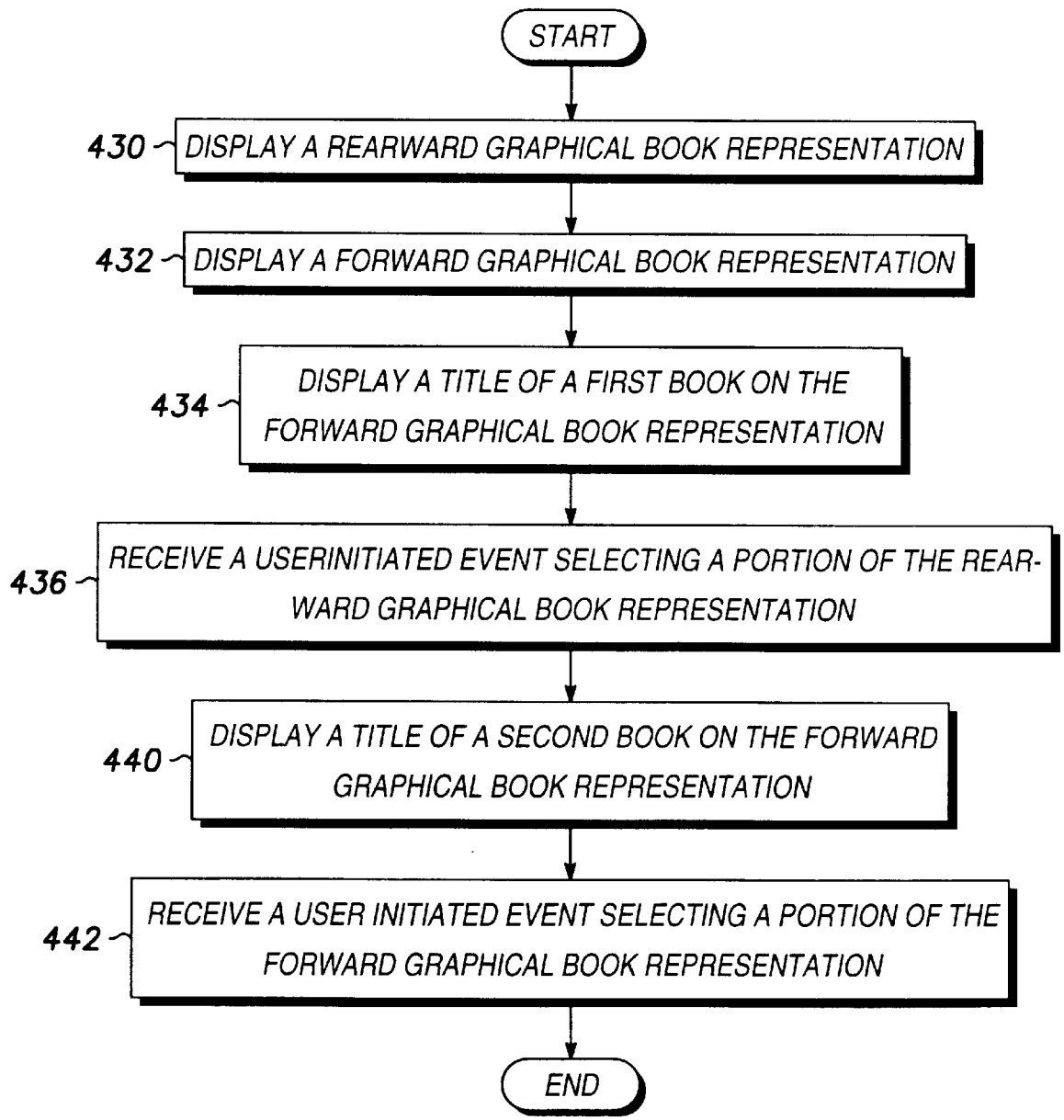
FIG. 26 is a flow diagram of steps performed in an embodiment of a library graphical user interface routine for use in the electronic book.

FIG. 26 is a flow diagram of steps performed in an embodiment of a library graphical user interface routine for use in the electronic book. These steps can be performed in executing the library graphical user interface routine indicated by block 400 in FIG. 25. The steps provide a method of selecting a book for reading in an electronic book where the book is selected from a plurality of books in a library.

As indicated by block 430, a step of displaying a rearward graphical book representation having a graphical spine portion is performed. A step of displaying a forward graphical book representation in front of the rearward graphical book representation is performed as indicated by block 432. The forward graphical book representation has a graphical spine portion and a graphical front cover portion.

As indicated by block 434, a step of displaying a title of a first book of the plurality of books on the forward graphical book representation is performed. The title of the first book can be displayed anywhere on the forward graphical book representation. However, in a preferred embodiment, the title of the first book is displayed on the graphical spine portion of the forward graphical book representation. FIG. 5 illustrates an example of the rearward graphical book representation 200 having the graphical spine portion 202, the forward graphical book representation 204 having the graphical spine portion 206 and the graphical front cover portion 208, and the title 210 displayed on the forward graphical book representation 204.

With reference again to FIG. 26, a step of receiving a first user-initiated event in which a portion of the rearward graphical book representation is selected is performed as indicated by block 436. In a preferred embodiment, the portion of the rearward graphical book representation selected in this step is within the graphical spine portion of the rearward graphical book representation. Upon receiving the first user-initiated event, a step of displaying a title of a second book of the plurality of books is performed as indicated by block 440. Preferably, the title of the second book is displayed in place of the title of the first book on the graphical spine portion of the forward graphical book representation.

As indicated by block 442, a step is performed of receiving a second user-initiated event in which a portion of the forward graphical book representation is selected. In a preferred embodiment, the portion of the forward graphical book representation selected in this step is within the front cover portion of the forward graphical book representation. The reception of the second user-initiated event ends the execution of the library graphical user interface routine, and flow is directed to the routine to display pages of text from the second book. Here, steps are performed of reading machine-readable data from a machine-readable storage medium installed in the electronic book, the machine-readable data being representative of text from the second book, and displaying the text represented by the machine-readable data.

It is noted that the steps indicated by blocks 436 and 440 can be repeated to allow the user to rotate through the plurality of books. When the first user-initiated event is received while a last of the plurality of books is displayed, the next title displayed is that of the first of the plurality of books.

It is preferred that steps of displaying and receiving user-initiated events all be performed using the touchscreen 130 integrated in the electronic book. However, in alternative embodiments of the electronic book which include a series of buttons external to the touchscreen 130, any of the above-described user-initiated events may be received using these buttons.

Figure 27:
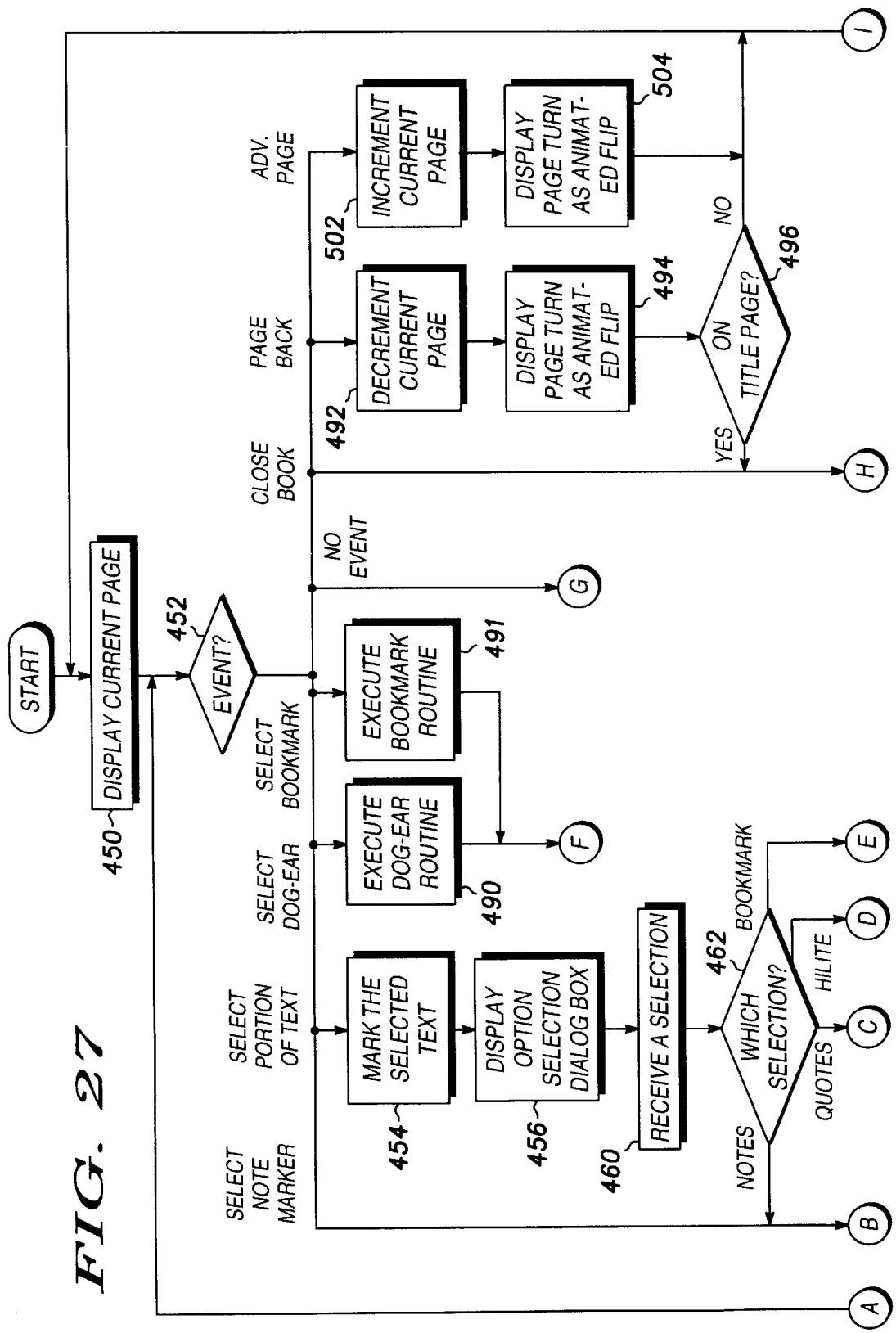
FIGS. 27 and 28 show flow diagrams of an embodiment of the routine to display pages of text in the electronic book.
Figure 28:
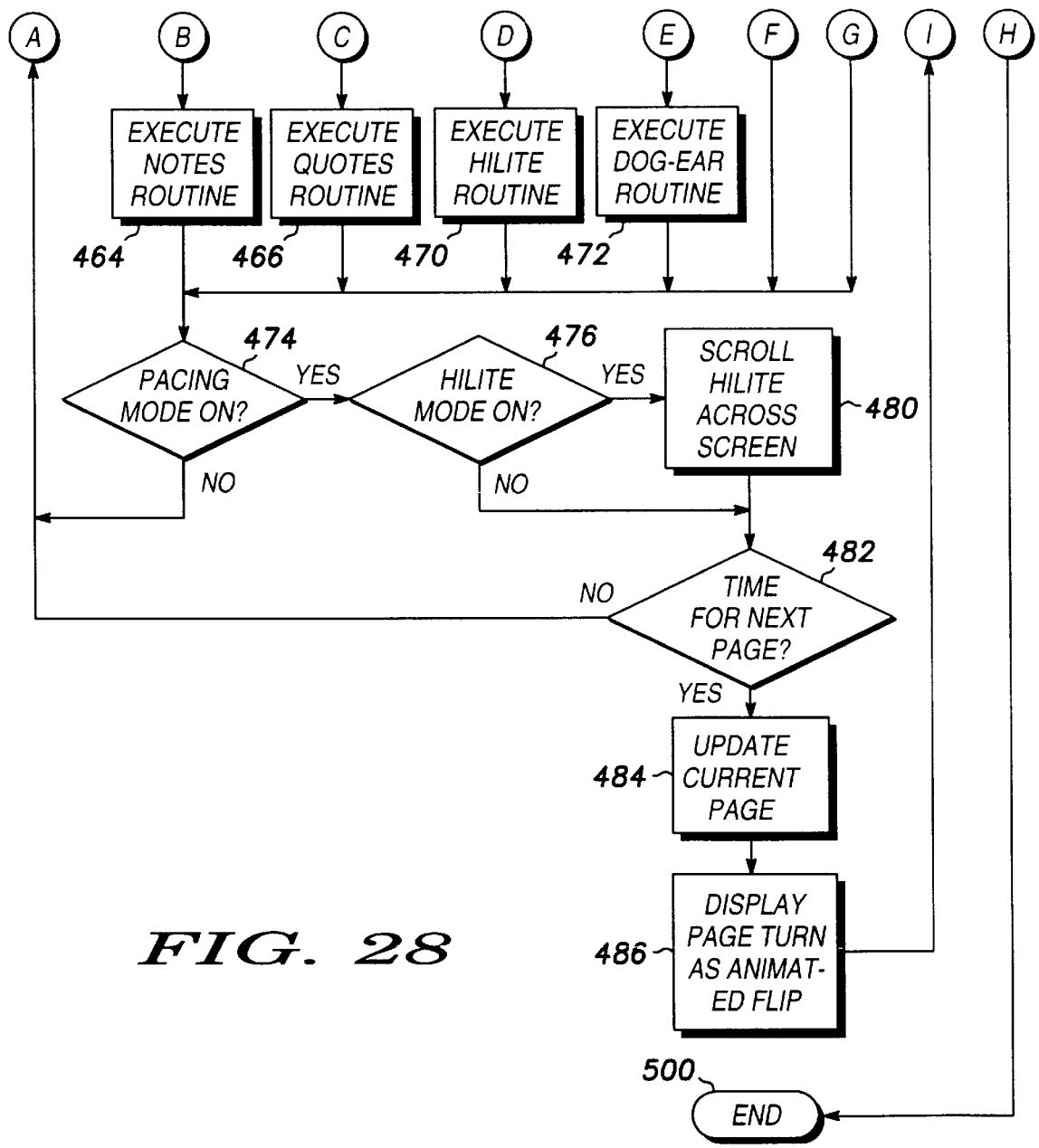

FIGS. 27 and 28 show flow diagrams of an embodiment of the routine to display pages of text in the electronic book. The steps indicated in these flow diagrams are performed in one embodiment of the step indicated by block 402 in FIG. 25.

Upon entering the routine, a step of displaying a current page of the book is performed as indicated by block 450. The current page includes text from the current page of the book, a graphical display of a number of pages remaining in the book, a display of a bookmark graphic if there is a bookmark associated with the current page, a dog ear graphic if the current page is dog-eared, and a note marker icon if there is an annotation associated with the current page. Optionally, the current page includes graphics from the current page of the book.

After displaying the current page, a branching step is performed, as indicated by block 452, based upon any user-initiated events which are received. If a user-initiated event is received which selects a portion of the text, a step of marking the portion of the text is performed as indicated by block 454. The portion of the text can be marked either by color or grey scale highlighting the portion of the text, underlining the portion of the text, or displaying the portion of the text in a reverse video form. The portion of the text can be selected directly by a user sliding a finger or a stylus over the portion of the text. Alternatively, the portion of the text can be selected indirectly by a menu selection technique.

After the portion of the text has been marked, a step of displaying an option selection dialog box is performed as indicated by block 456. The option selection dialog box provides a plurality of options to the user, including a note capture option, a highlighting option, a quote capture option, and a set bookmark option.

As indicated by block 460, a step of receiving a user-initiated event indicative of a selection of one of the options is performed. Based upon the selection, a branching step is performed as indicated by block 462. If the note capture option is selected, then a step of executing an annotation subroutine is performed as indicated by block 464. If the quote capture option is selected, then a step of executing a quote capture subroutine is performed as indicated by block 466. If the highlighting option is selected, then a step of executing a highlighting subroutine is performed as indicated by block 470. If the set bookmark option is selected, then a step of executing a bookmark subroutine is performed as indicated by block 472.

Upon completing the execution of either the annotation subroutine, the quote capture subroutine, the highlighting subroutine, or the bookmark subroutine, a step of determining whether a pacing mode is active is performed as indicated by block 474. If the pacing mode is inactive, then flow of the routine is directed back to block 452 which performs a branching step based upon a received user-initiated event. If the pacing mode is active, then a step of determining whether a highlighting mode is active is performed as indicated by block 476. If the highlighting mode is active then a step of scrolling a highlight across the current page is performed as indicated by block 480. Scrolling the highlight across the current page allows pacing of a user's scanning across the current page. A user can activate the highlighting mode to help enhance his or her reading speed.

The highlight which is scrolled across the page can be in the form of either a color or grey scale highlight, an underlining of text, or a reverse video form of text. If the touchscreen 130 is capable of selective backlighting, then the highlight can be in the form of a selective backlighting of a reduced portion of the touchscreen 130.

After scrolling the highlight across the current page in block 480 or if the highlighting mode is inactive, then a step of determining whether it is time for displaying a subsequent page is performed as indicated by block 482. If the time has not yet come for displaying a subsequent page, then flow is directed back to block 452. If the time has arrived for displaying a subsequent page, then a step of updating the current page is performed as indicated by block 484. Next, a step of displaying a forward page turn in an animated matter is performed as indicated by block 486. This step includes displaying an animated sequence of images which simulates a forward flipping of a page. Flow of the routine is then directed back to block 450 to display the new current page.

With reference to block 452, if a user-initiated event is received indicative of the user selecting the note marker icon, then the step of executing the annotation routine indicated by block 464 is performed. Thereafter, subsequent steps are performed beginning with the step indicated by block 474.

With reference to the branching step performed in block 452, if a dog ear user-initiated event is received, then a step of executing a dog ear routine is performed as indicated by block 490. If the user-initiated event is indicative of the user selecting the bookmark portion of the page, then a step of executing a bookmark management routine is performed as indicated by block 491. Thereafter, subsequent steps are performed beginning with the step indicated by block 474. Similarly, if no user-initiated events are received in block 452, then flow of the routine is directed to the step indicated by block 474.

If the user-initiated event is indicative of the user selecting the page back portion of the page, then flow from block 452 branches to a step of decrementing the current page as indicated by block 492. Further, a step of displaying a backward page turn in an animated matter is performed as indicated by block 494. This step includes displaying an animated sequence of images which simulates a backward flipping of a page. The steps indicated by blocks 486 and 494 give the user the sense or feel that a page of information is being turned in place, carrying forward the familiar paradigm of turning the page on a standard paper book.

As indicated by block 496, a step of determining whether the new current page is the title page is performed after the step of block 494. If the new current page is the title page, then execution of the routine to display pages of text in the electronic book is completed as indicated by block 500. If the new current page is any page but the title page, then flow of the routine is directed back to block 450 wherein a step of displaying the new current page is performed.

If the user-initiated event is indicative of the user selecting the advance page portion of the page, then flow is directed from the step indicated by block 452 to a step of incrementing the current page as indicated by block 502. Further, a step of displaying a forward page turn in an animated matter is performed is indicated by block 504. Flow of the routine is then directed back to block 450 wherein the new, incremented current page is displayed.

Figure 29:
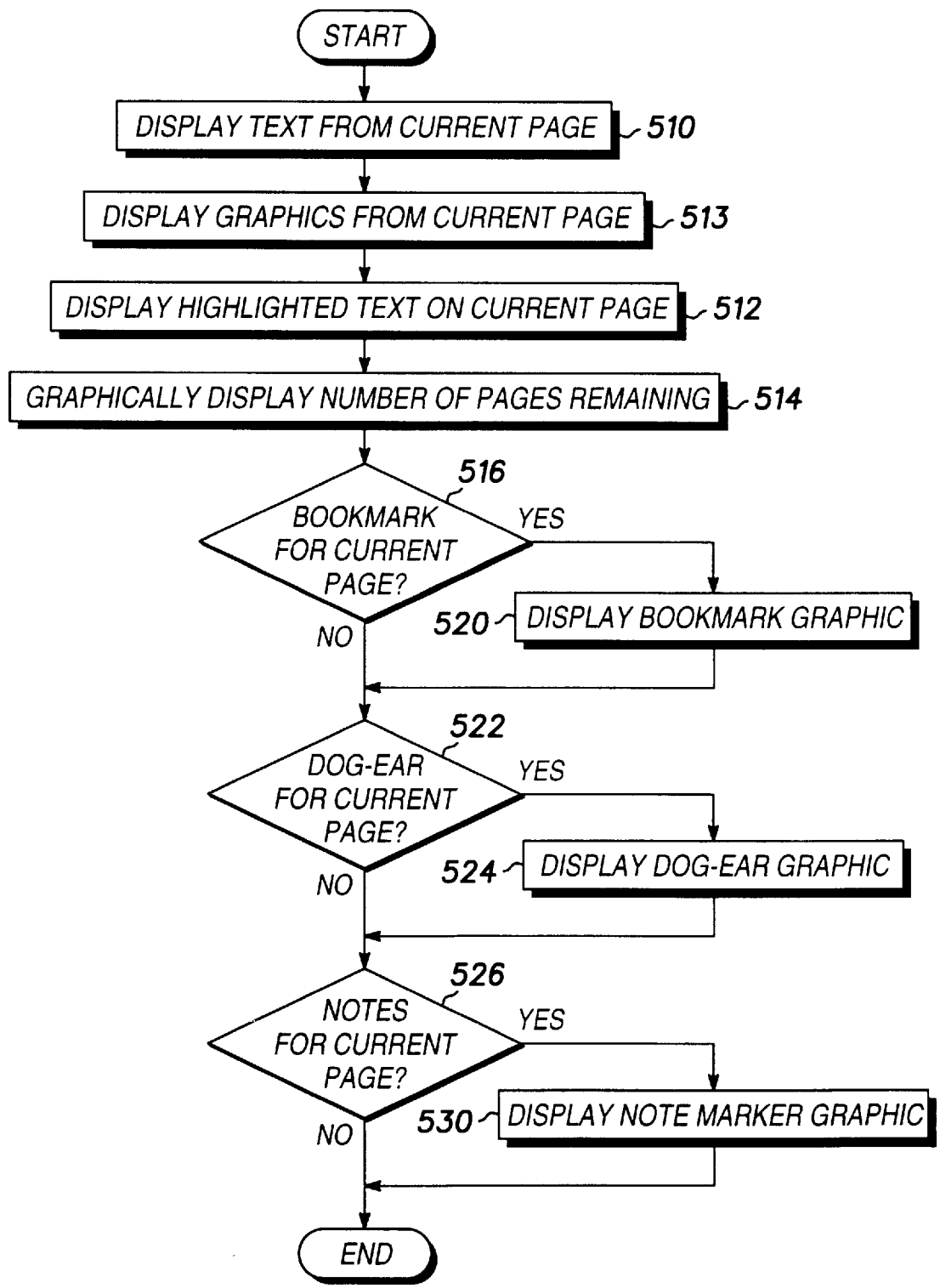
FIG. 29 is a flow diagram of steps performed to display a current page in the electronic book.

FIG. 29 is a flow diagram of steps performed to display a current page in the electronic book. These steps constitute one embodiment of a method of performing the step indicated by block 450 in FIG. 27.

As indicated by block 510, a step of displaying text from the current page of the book is performed. The text is displayed in accordance with a primary font parameter and a primary size parameter. If there is any highlighting associated with a portion of the text on the current page, then a step of displaying the portion of the text in a highlighted manner is performed as indicated by block 512. If any graphical information is included in the current page, then a step of displaying the graphical information is performed as indicated by block 513.

As indicated by block 514, a step of graphically displaying a number of pages remaining in the book is performed. The number of pages remaining in the book can be displayed in the sixth portion 188 of the touchscreen 130 as illustrated in FIG. 4. The number of pages remaining in the book can be graphically displayed using either an image of a number of pages, a dark line as a drop shadow, or a group of parallel lines to indicate relative depth by page number in a given document. When the current page is one of the early pages in the book, the drop shadow or graphical image depth is relatively deep, indicating that there is a significant portion of the book remaining to be read. When the current page is near the middle of the book, the drop shadow or graphical image depth is half as deep. When nearing the end of the book, the drop shadow or graphical image depth becomes very thin indicating that the reader is almost at the end of the book. As a result, the user can determine at a glance how much of the book has been read, and their relative position within the book just as a standard paper book. As an alternative to using a top portion of the touchscreen for graphically displaying the number of pages remaining in the book, a side edge and/or a bottom edge of the touchscreen 130 can be utilized to provide this graphical display.

As indicated by block 516, a step of determining if a bookmark is associated with the current page is performed. If a bookmark is associated with the current page, then a step of displaying a bookmark graphic is performed as indicated by block 520.

As indicated by block 522, a step of determining if the current page is dog-eared is performed. If the current page is dog-eared, then a step of displaying a dog ear graphic is performed as indicated by block 524.

As indicated by block 526, a step of determining whether an annotation exists for the current page is performed. If there is an annotation associated with the current page, then a step of displaying a note marker icon is performed as indicated by block 530.

Figure 30:
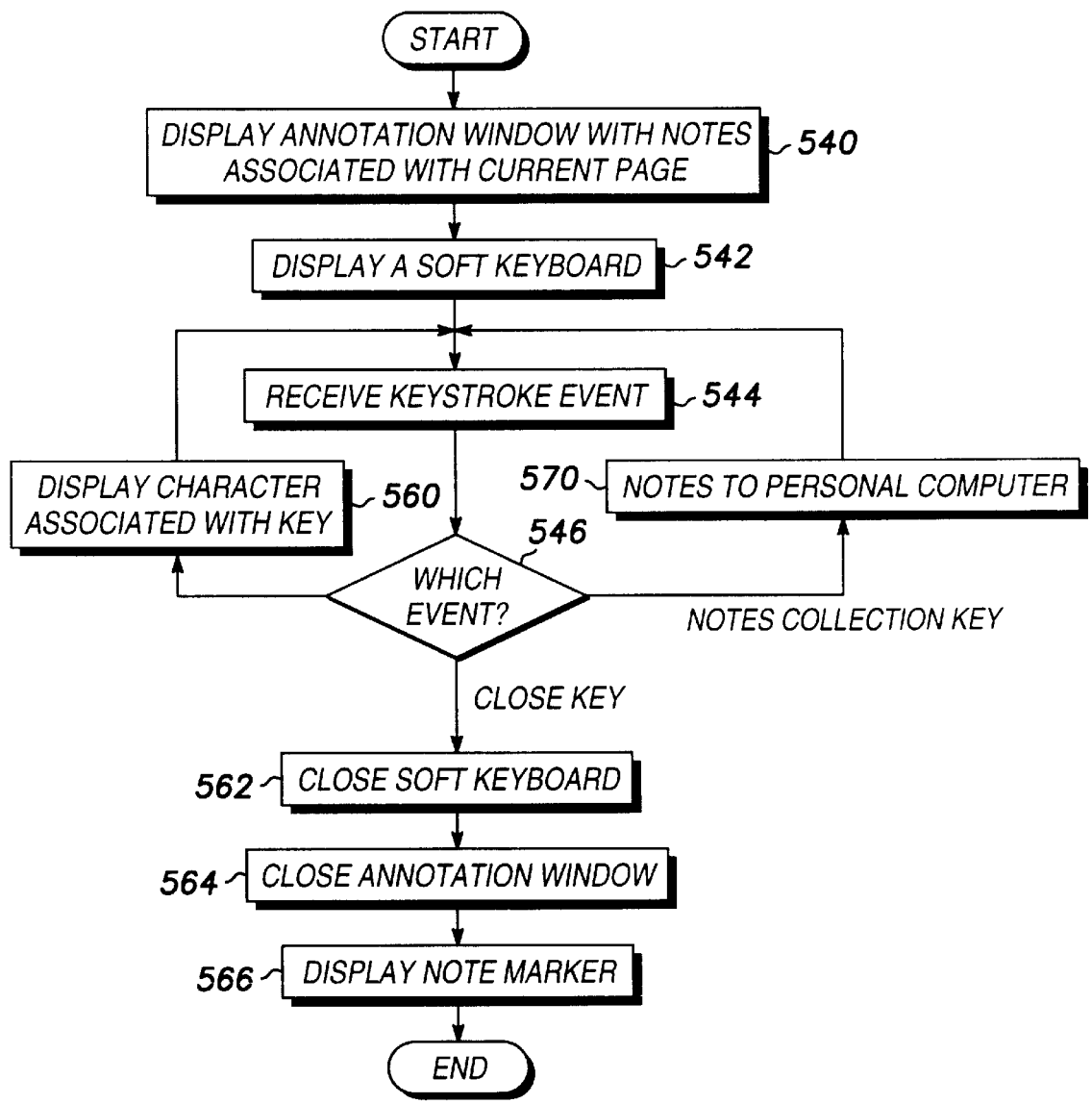
FIG. 30 is a flow diagram of steps performed in an embodiment of an annotation subroutine.

FIG. 30 is a flow diagram of steps performed in an embodiment of an annotation routine. Such an annotation routine is executed in the step indicated by block 464 in FIG. 28.

As indicated by block 540, a step of displaying a window for displaying the annotation is performed. As indicated by block 542, a step of displaying a soft keyboard on the touchscreen 130 is performed. The soft keyboard is provided to receive a plurality of keystroke events to form the annotation.

After displaying the soft keyboard and the annotation window, a step of receiving a keystroke event is performed as indicated by block 544. As indicated by block 546, a branching operation is performed based upon the keystroke event received in block 544. If the keystroke event is indicative of the user selecting either an alphanumeric key or a symbolic key on the soft keyboard, then a step of displaying a character associated with the key is performed as indicated by block 560. The character associated with the key is displayed within the annotation window. After displaying the character, flow of the routine is directed back to block 544 wherein a subsequent keystroke event is received.

Referring back to the branching step indicated by block 546, if the keystroke event is indicative of a user selecting the close key from the soft keyboard, then a step of closing the soft keyboard is performed as indicated by block 562. A step of closing the annotation window is also performed, as indicated by block 564. As indicated by block 566, a step of displaying a note marker icon on the page is performed. Thereafter, execution of the annotation subroutine is completed.

With reference again to the branching step performed in block 546, if the keystroke event is indicative of the user selecting the notes collection key, then a step of communicating the annotation to an external personal computer is performed as indicated by block 570. After communicating the annotation to the personal computer, flow of the routine is directed back to block 544 wherein a subsequent keystroke event is received.

Figure 31:
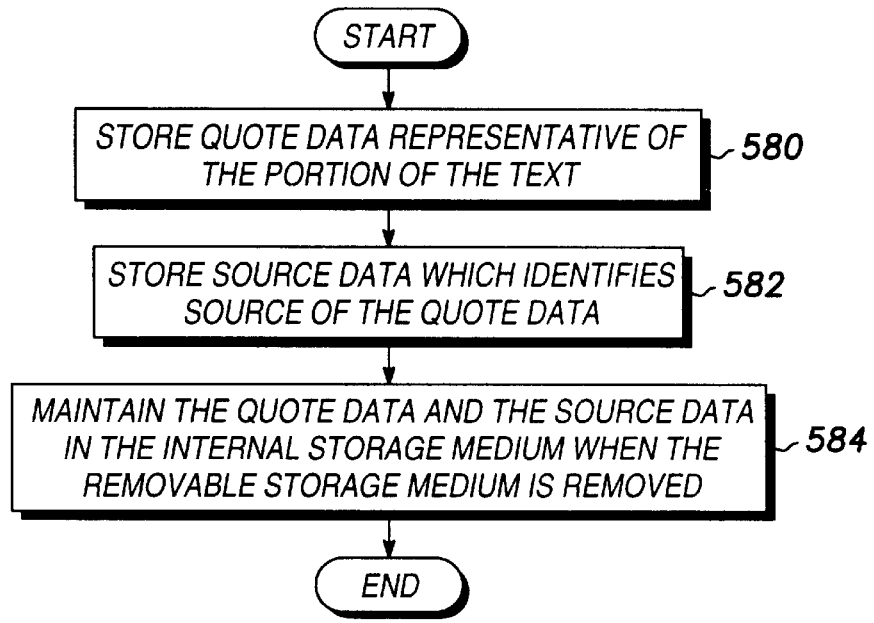
FIG. 31 is a flow diagram of steps performed in an embodiment of a quote capture subroutine.

FIG. 31 is a flow diagram of steps performed in an embodiment of a quote capture subroutine. Such a quote capture subroutine can be performed to provide the step indicated by block 466 in FIG. 28.

Prior to entering the quote capture subroutine, a user-initiated event was received in the electronic book which selects a portion of the text displayed on the touchscreen. After receiving the user-initiated event, a plurality of text marking options, including a quote capture option, is displayed, and a user-initiated event indicative of a user selecting the quote capture option is received.

As indicated by block 580, a step of storing quote data representative of the portion of the text is performed. The quote data is stored in the internal machine-readable storage medium 154 illustrated in FIG. 3.

As indicated by block 582, a step of storing source data which identifies the source of the quote data is performed. The source data can be representative of the author of the book, the title of the book, a copyright date of the book, and/or a publisher of the book. The source data is stored in the internal machine-readable storage medium 154 from FIG. 3.

As indicated by block 584, a step is performed of maintaining the quote data and the source data in the internal machine-readable storage medium when the removable machine-readable storage medium is removed from the electronic book. As a result of this step, subsequent steps can be performed based upon the quote data and the source data when the removable machine-readable storage medium is removed. Specifically, a step of retrieving the quote data and the source data from the internal machine-readable storage medium can be performed when the removable machine-readable storage medium is removed from the electronic book. Thereafter, a step of displaying the portion of the text represented by the quote data and source information represented by the source data can be performed.

Figure 32:
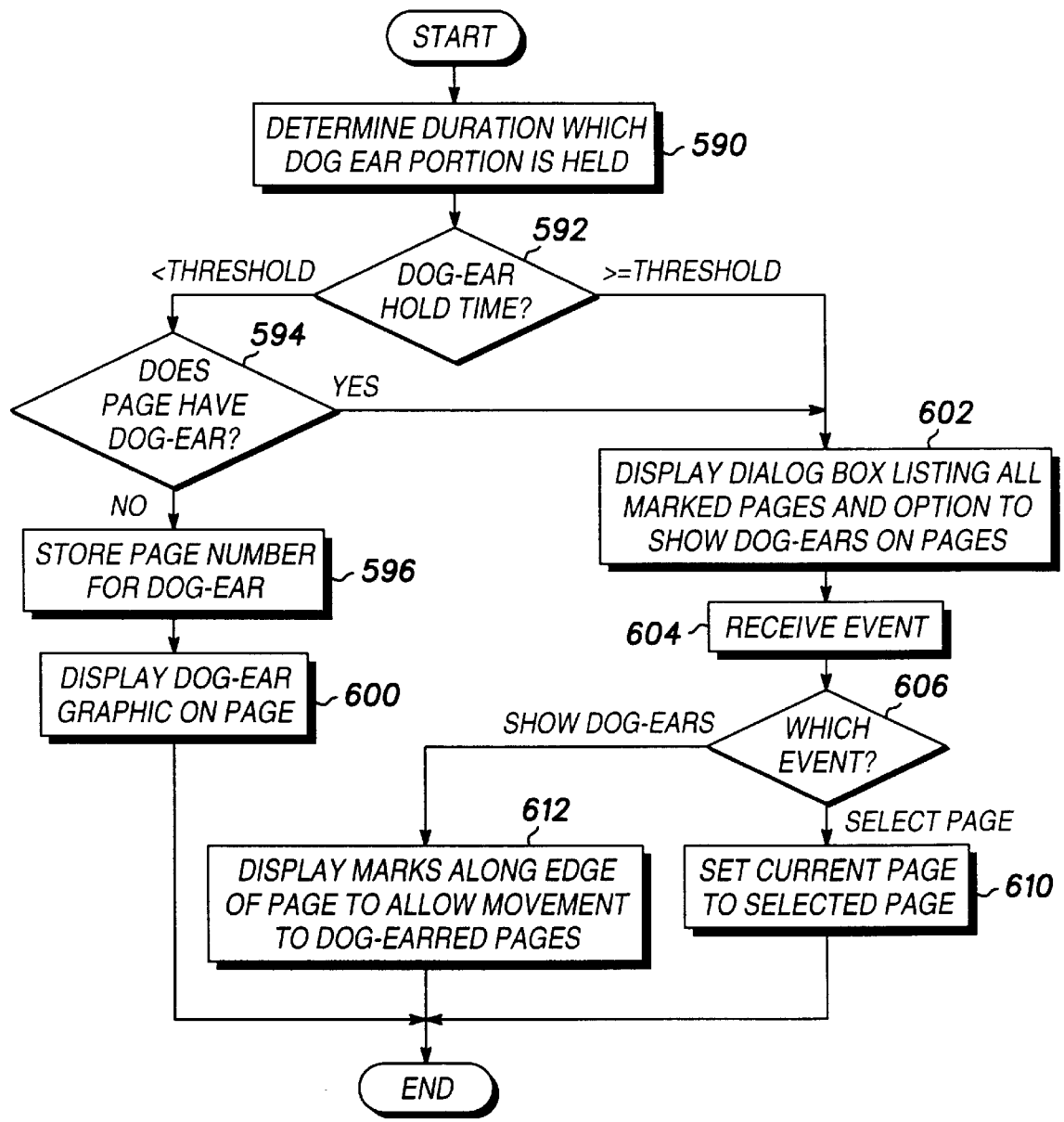
FIG. 32 is a flow diagram of steps performed in an embodiment of a dog ear subroutine.

FIG. 32 is a flow diagram of steps performed in an embodiment of a dog ear subroutine. Such a dog ear subroutine is executed in the step indicated by block 490 in FIG. 27.

As indicated by block 590, a step is performed of determining a duration in which a dog ear portion of the touchscreen is held. A step of comparing the duration to a predetermined threshold is performed as indicated by block 592. The predetermined threshold can be about a second. If the duration is less than the predetermined threshold, then a step of determining whether the current page has a dog ear is performed as indicated by block 594. If the current page does not have a dog ear, then a step of storing an indication that the current page be dog-eared is performed as indicated by block 596. Further, a step of displaying a dog ear graphic in an upper corner portion of the touchscreen 130 is performed as indicated by block 600. Thereafter, execution of the dog ear subroutine is completed.

With reference to blocks 592 and 594, if the duration is greater than or equal to the predetermined threshold or if the current page is already dog-eared, then a step of displaying a dog-eared dialog box is performed as indicated by block 602. Within the dog-eared dialog box, a list of all marked pages is displayed. Further, an option to show marks corresponding to all of the marked pages along an edge of each page is displayed.

As indicated by block 604, a user-initiated event is received. As indicated by block 606, a branching step is performed based upon the user-initiated event received. If the user-initiated event is indicative of a user selecting a page number from the list of marked pages, then a step of setting the current page to the selected page number is performed as indicated by block 610. If the user-initiated event is indicative of the user selecting the marking option, then a step of displaying marks corresponding to the dog-eared pages along an edge of the page is performed as indicated by block 612.

Figure 33:
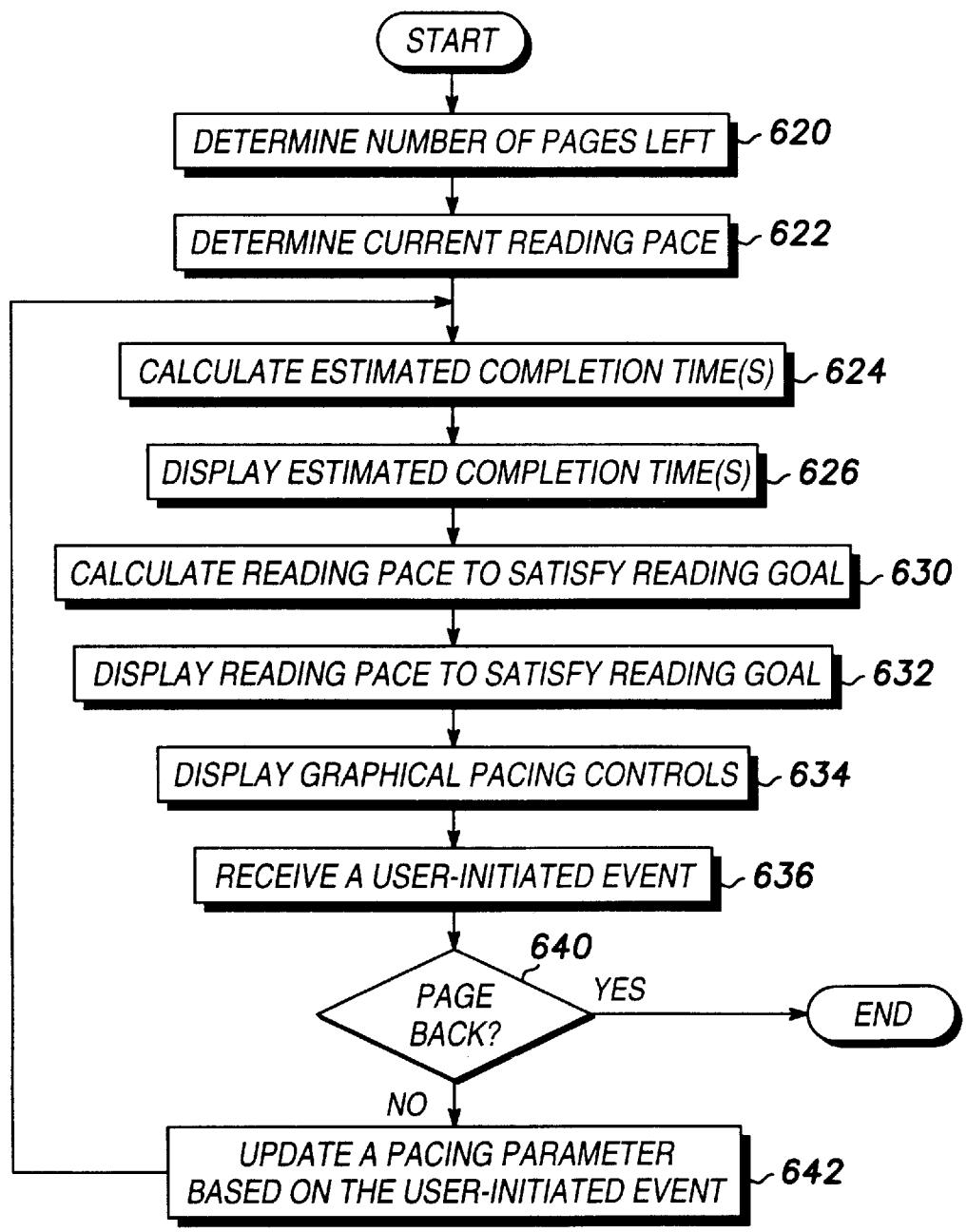
FIG. 33 is a flow diagram of steps performed in an embodiment of a pacing control subroutine.

FIG. 33 is a flow diagram of steps performed in an embodiment of a pacing control subroutine. The pacing control subroutine is executed in the step indicated by block 472 in FIG. 25.

As indicated by block 620, a step of determining a number of pages remaining in the book is performed. As indicated by block 622, a step of determining a current reading pace of the user is performed.

Based upon the number of pages remaining in the book, a step of calculating one or more estimated completion times is performed as indicated by block 624. A first estimated completion time can be calculated by dividing the number of words or pages remaining in the book by the current reading pace of the user. As a result, the first estimated completion time estimates how long it would take the user to complete the book at his or her current reading pace. A second estimated completion time is calculated by dividing the number of words or pages remaining in the book by a desired reading pace. The second estimated completion time estimates how long it would take the user to complete the book at the desired reading pace.

As indicated by block 626, a step of displaying each estimated completion time is performed. Each estimated completion time can be displayed within a corresponding sentence as illustrated in FIG. 15.

As indicated by block 630, a step of calculating a necessary reading pace to satisfy a predetermined reading goal is performed. The predetermined reading goal can be in the form of a time duration within which a user wishes to complete the pages remaining in the book. Here, the necessary reading pace is calculated by dividing the number of pages remaining in the book by the time duration. A step of displaying the necessary reading pace to satisfy the reading goal is then performed as indicated by block 632.

As indicated by block 634, a step of displaying one or more graphical pacing controls is performed. As illustrated in FIG. 15, the one or more graphical pacing controls can include a graphical slider bar such as the graphical slider bar 294 used for modifying the desired reading pace, and a graphical switch such as the graphical switch 296 which is used for enabling and disabling an automatic pacing of the text using a pacing routine.

As indicated by block 636, a user-initiated event is received. As indicated by block 640, if the user-initiated event is indicative of the user selecting the page back portion of the touchscreen 130, then execution of the pacing control subroutine is terminated. Upon terminating the pacing control subroutine, the system control page is displayed on the touchscreen 130.

If the user-initiated event is not indicative of the user selecting the page back portion, then a step of updating a pacing parameter based on the user-initiated event is performed as indicated by block 642. Examples of the pacing parameter include the desired reading pace and the reading goal. After updating the pacing parameter, flow of the subroutine is directed back to block 624 to recalculate an estimated completion time and the necessary reading pace.

Figure 34:
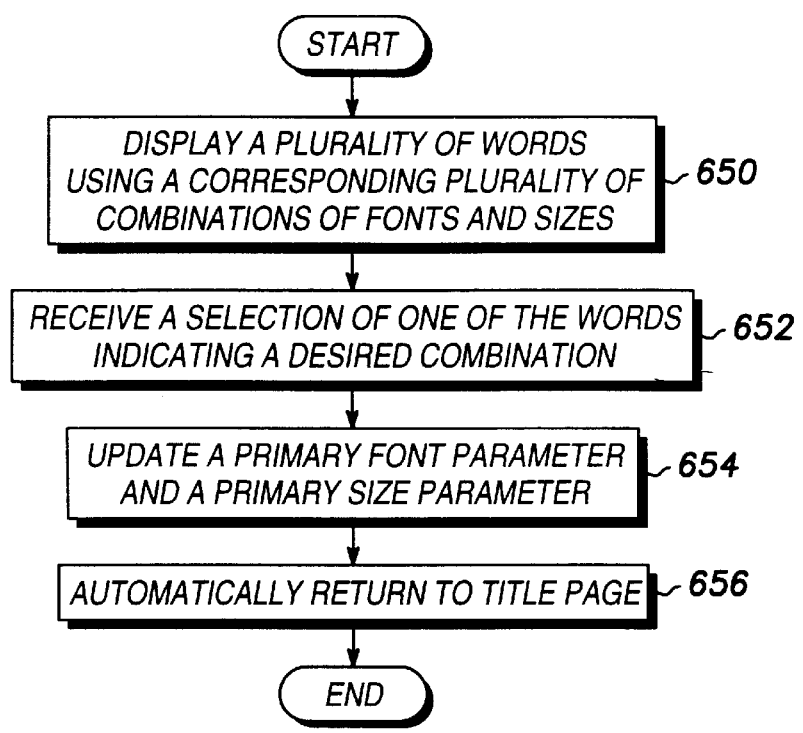
FIG. 34 is a flow diagram of steps performed in an embodiment of the font selection subroutine.

FIG. 34 is a flow diagram of steps performed in an embodiment of the font selection subroutine. The font selection subroutine is executed in block 414 in the event loop of FIG. 25.

As indicated by block 650, a step of displaying a plurality of words using a corresponding plurality of combinations of different fonts and different sizes is performed. More specifically, each word is displayed using a specific font and a specific size in accordance with the combination corresponding thereto. Optionally, the step of displaying the plurality of words can include displaying a respective font name for each of the combinations. As another option, the step of displaying the plurality of words can include displaying a single textual expression using the corresponding plurality of combinations.

As indicated by block 652, a step of receiving a user-initiated event indicative of the user selecting one word of the plurality of words is performed. This selection indicates which font/size combination is desired by the user.

As indicated by block 654, a step of updating a primary font parameter and a primary size parameter is performed. The primary font parameter and the primary size parameter are updated in accordance with the font/size combination selected by the user. As indicated by block 656, a step of automatically returning to displaying the title page is performed after receiving the user-initiated event selecting the one word. Thereafter, a subsequent step of displaying text of a book includes displaying the text using the primary font in a size at least the primary size.

Figure 35:
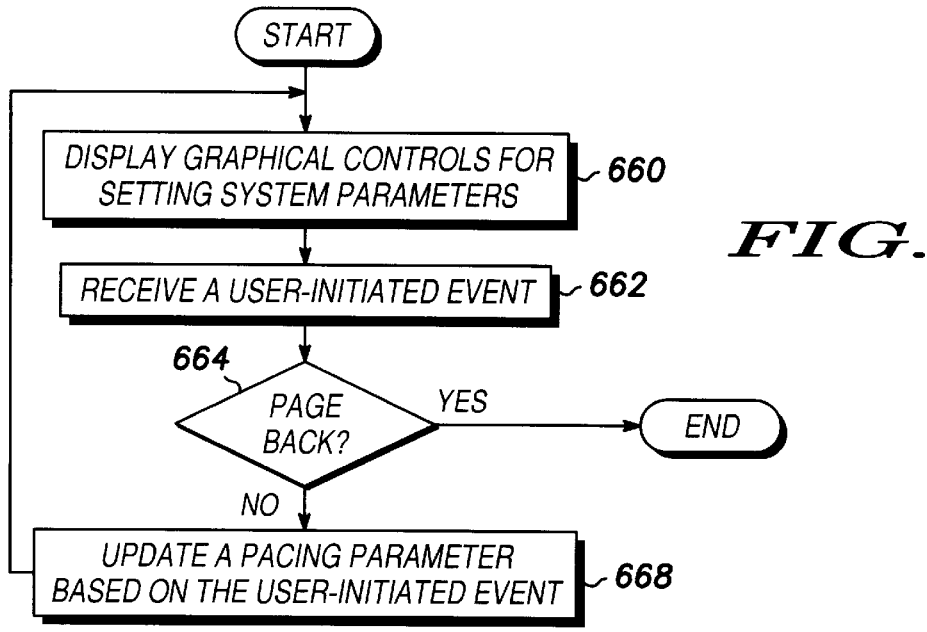
FIG. 35 is a flow diagram of steps performed in an embodiment of the system control subroutine.

FIG. 35 is a flow diagram of steps performed in an embodiment of the system control subroutine. The system control subroutine is executed in the step indicated by block 416 in the event loop of FIG. 25.

As indicated by block 660, a step of displaying a plurality of graphical controls for setting system parameters is performed. The system parameters can include display parameters such as a contrast parameter, a tint parameter, and a color parameter. The system parameters can also include a sound parameter.

As indicated by block 662, a step of receiving a user-initiated event is performed. If the user-initiated event is indicative of the user selecting the page back portion of the touchscreen, as indicated by block 664, then execution of the system control subroutine is completed. For other user-initiated events, a step of updating a system parameter is performed as indicated by block 668.

A method and apparatus for inhibiting the operation of an electronic device during take-offs and landings of an aircraft, has a sensor for determining when a take-off or landing is occurring. A control circuit coupled to the sensor then inhibits operation of the electronic device. If the electronic device is an "unintelligent" device the control circuit opens a switch that controls power to the electronic device. If the electronic device is an "intelligent" device the control circuit sends a signal to the electronic device to initiate a shut down procedure. This prevents the "intelligent" electronic device from losing files or other critical information that might be lost if the power was suddenly shut off. The electronic book is an example of an intelligent electronic device that could profit from this apparatus and method.

Figure 36:
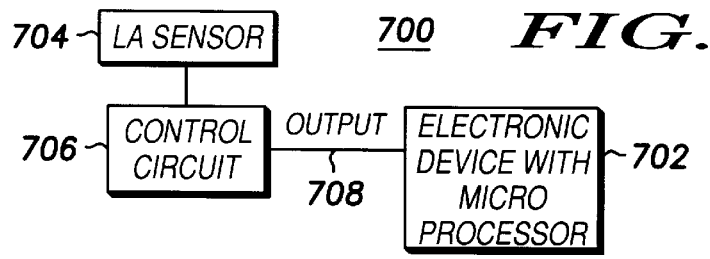
FIG. 36 is a block diagram of an embodiment of an apparatus for inhibiting operation of an electronic device integrated into the electronic device.

An embodiment of an apparatus 700 for inhibiting operation of an electronic device 702 during take-offs and landings is shown in FIG. 36. A sensor 704 detects a physical parameter that is associated with take-offs and landings of an aircraft. For instance, the sensor may detect the lateral acceleration. When the device is being used in an aircraft the lateral acceleration increases significantly during take-offs and landings. When a control circuit 706 determines that the lateral acceleration is outside a predetermined range, it sends an inhibit signal (output) 708 to the electronic device 702.

Figure 37:
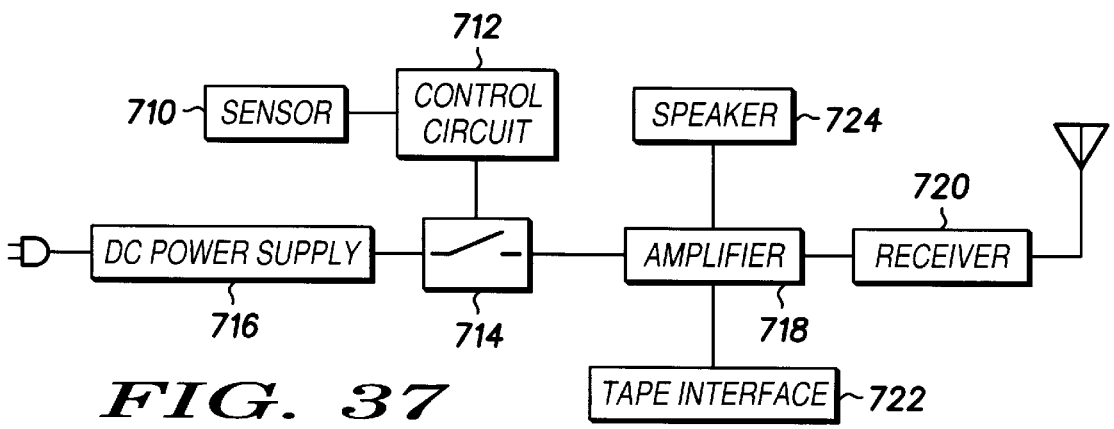
FIG. 37 is a block diagram of an embodiment of an apparatus for inhibiting operation of an electronic device integrated into the electronic device.

Another embodiment of the apparatus for inhibiting operation of electronic device integrated into an unintelligent device is shown in FIG. 37. A sensor 710 is coupled to a control circuit 712. The control circuit 712 opens a controllable switch 714 when it determines a takeoff or landing is occurring. The controllable switch 714 disconnects an output of a DC power supply (power line) 716 from the rest of the electronic device. The electronic device is depicted as a radio/tape player and comprises an amplifier 718 having inputs from a receiver 720 and a tape interface 722. The output of the amplifier 718 is connected to a speaker 724.

Figure 38:
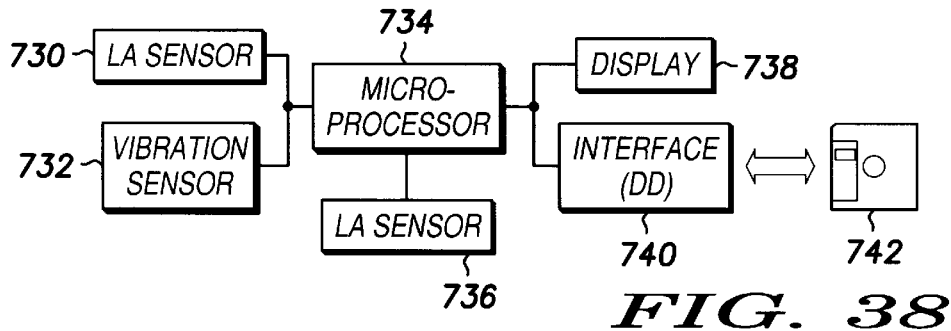
FIG. 38 is a block diagram of an embodiment of an apparatus for inhibiting operation of an electronic device integrated into the electronic device.

Another embodiment of the apparatus for inhibiting operation of an electronic device integrated into an intelligent device is shown in FIG. 38. Two sensors are shown, a first sensor 730 measures lateral acceleration (LA) and a second sensor (vibration sensor) 732 measures a second parameter, for instance a vibration characteristic. A microprocessor 734 is coupled to the sensors 730, 732 and determines when both sensors are in a state indicative of a takeoff or a landing. The microprocessor 734 then initiates an intelligent shut down procedure that stores any active files and then limits power to all non-essential operations. The microprocessor 734 can also be part of the intelligent device, that further comprises an internal memory 736 coupled to the microprocessor 734. A display 738 and an interface 740 are also coupled to the microprocessor 734. The interface 740 can be a disk drive capable of accepting a computer disk 742.

The computer disk 742 being a computer-readable storage medium having computer-readable data that when inserted into and executed by a computer device, performs the following steps:

(a) receiving a lateral acceleration from a sensor in the computer device;

(b) determining if the lateral acceleration exceeds a threshold; and (c) when the lateral acceleration exceeds the threshold for a period of time, inhibiting an operation of the computer device.

Figure 39:
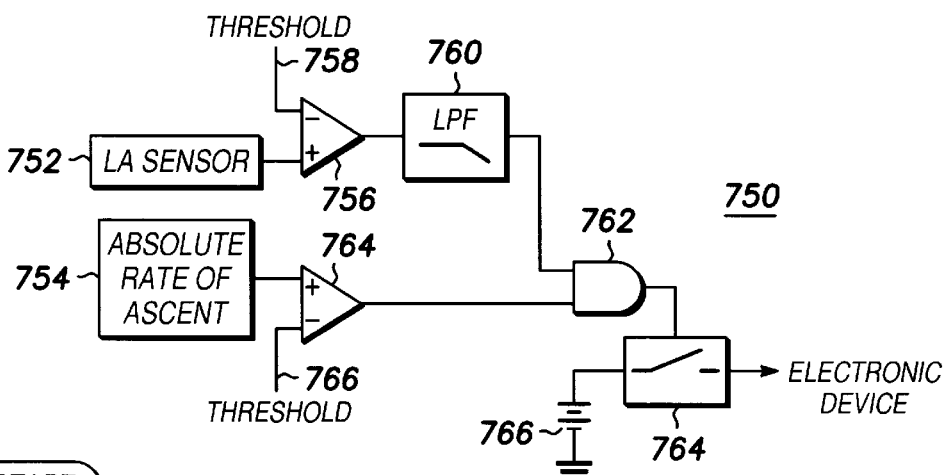
FIG. 39 is a block diagram of an embodiment of an apparatus for inhibiting operation of an electronic device.

FIG. 39 is an embodiment of the apparatus 750 for inhibiting operation of an electronic device. The apparatus 750 is shown with a pair of sensors. A first sensor 752 measures lateral acceleration (absolute) a second sensor 754 measures the absolute rate of ascent. A first comparator 756 compares the output of the first sensor 752 to a predetermined threshold 758. The output of the comparator 756 is passed through a low pass filter 760 that integrates the output, thus reducing false positives from bumps. The output of the low pass filter 760 is one input to an AND gate 762. A second comparator 764 compares the output of the second sensor 754 to a second threshold 766. The output of the second comparator 764 is a second input to the AND gate 762. The output of the AND gate 762 controls a switch 764, that connects a power source 766 to the electronic device. The apparatus 750 is illustrative of one way of implementing the control circuitry. Many other designs are possible including other hardware designs and microprocessor designs incorporating software or firmware necessary to complete the functions or the control circuitry.

Figure 40:
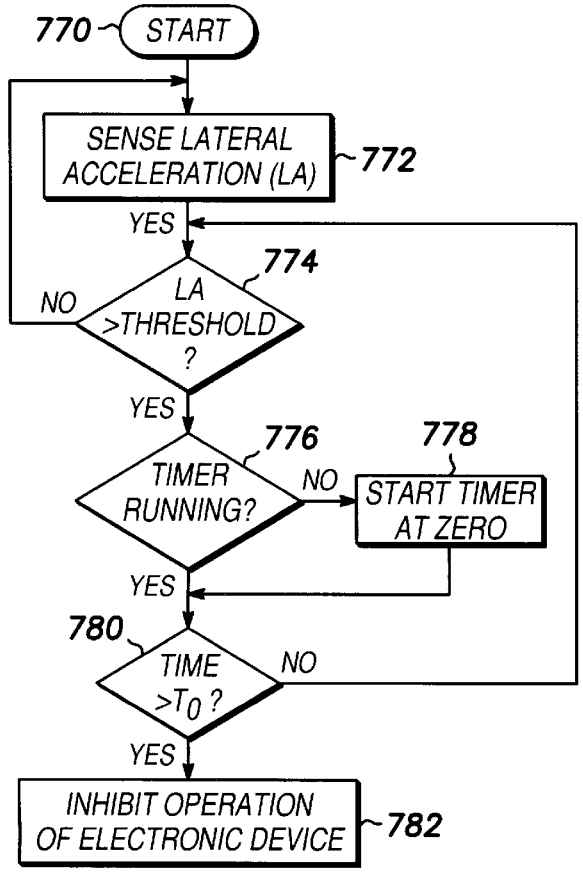
FIG. 40 is a flow diagram of steps performed in an embodiment of a method for inhibiting operation of an electronic device.

An embodiment of a method for inhibiting an operation of an electronic device during the take-off or landing of an aircraft is shown in FIG. 40. The process starts at block 770. At block 772 a lateral acceleration (LA) of the electronic device is sensed. When the (absolute) lateral acceleration does not exceed a predetermined threshold at block 774, the processing returns to block 772. When the lateral acceleration does exceed the threshold at block 774, it is determined if a timer has been started at block 776. When the timer is not running, it is started at block 778. When the timer is running, the time is compared to a predetermined period of time at block 780. When the time does not exceed the predetermined period of time, the processing returns to block 774. When the time does exceed the predetermined period of time, the process inhibits the operation of the electronic device at block 782.

Figure 41:
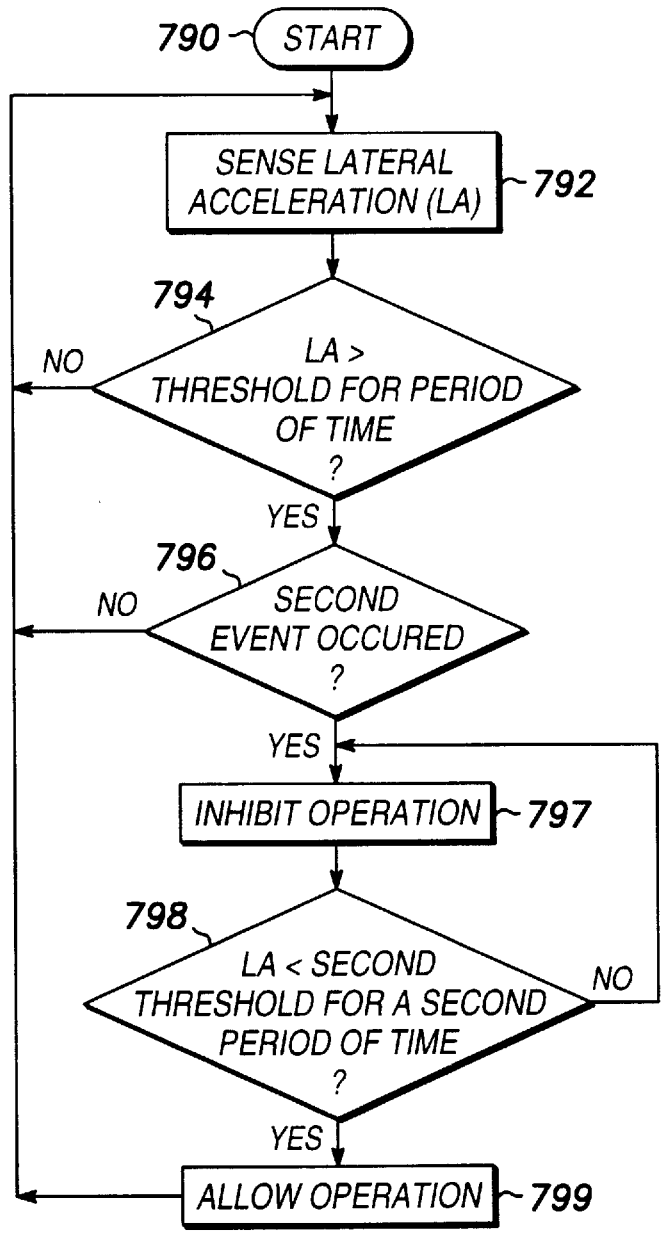
FIG. 41 is a flow diagram of steps performed in an embodiment of a method for inhibiting operation of an electronic device.

An embodiment of the method for inhibiting an operation of an electronic device during the take-off or landing of an aircraft is shown in FIG. 41. The process starts at block 790. At block 792 the (absolute) lateral acceleration is sensed at block 792. It is determined if the lateral acceleration exceeds a threshold for a predetermined period of time at block 794. When the lateral acceleration does not exceed the threshold for the predetermined period of time, the processing returns to block 792. When the lateral acceleration does exceed the threshold for the predetermined period of time, it is determined if a second event has occurred at block 796. The second event could be an absolute rate of ascent associated with take-offs and landings. The second event reduces false positives that could unnecessarily shutoff the electronic device. When the second event has not occurred, the processing returns to block 792. When the second event has occurred, the operation of the electronic device is inhibited (an inhibit operation flag) at block 797. In an intelligent device the inhibit operation flag is set. This causes the intelligent device to start a shut down procedure, that saves files (active information) that would be lost in a catastrophic shutdown procedure. If a start up request is received while the inhibit operation flag is set, the request is denied. In an unintelligent device the electronic device is inhibited by sending an inhibit operation signal to a power switch, causing the power switch to open.

When the lateral acceleration has not exceeded a second predetermined threshold for a second predetermined period of time at block 798, the processing returns to block 797. When the lateral acceleration 798 has exceeded the second threshold for the second predetermined period of time at block 798, operation of the electronic device is allowed at block 799 and processing returns to block 792.

An embodiment for a system 800 for inhibiting operation of an electronic device in an aircraft 802 during take-offs and landings, is shown in FIG. 42. A transmitter 804 broadcasts a signal when the aircraft is taking-off or landing. The signal is pickup by a receiver 806 that passes the signal to a controller 808. The controller 808 inhibits operation (via an inhibit signal line) of an electronic device 810, when it determines a signal indicative of a take-off or landing has been received. In other words, the controller an output with a first state when the take-off or landing signal has not been received, and a second state when the take-off or landing signal has been received. In one embodiment of the system 800 there is an input device 812 coupled to the transmitter 804 that is operable by an airline employee 814.

In another embodiment, the electronic device would transmit a signal that would notify the aircraft of its presence. A receiver in the aircraft would detect the signal and would transmit an inhibit signal to the electronic device during take-offs and landings.

An embodiment of the apparatus for inhibiting operation of an electronic device, integrated into an intelligent device is shown in FIG. 43. A receiver 820 receives a signal indicative of a take-off or landing. A microprocessor 822 receives the output of the receiver 820 and begins a shut down processes when a take-off or landing is occurring. The intelligent device is depicted as further including an internal memory 824 coupled to the microprocessor 822. A display 826 and an interface 828 are coupled to the microprocessor 822. The interface can be a disk drive designed to receive a computer disk 830.

Figure 44:
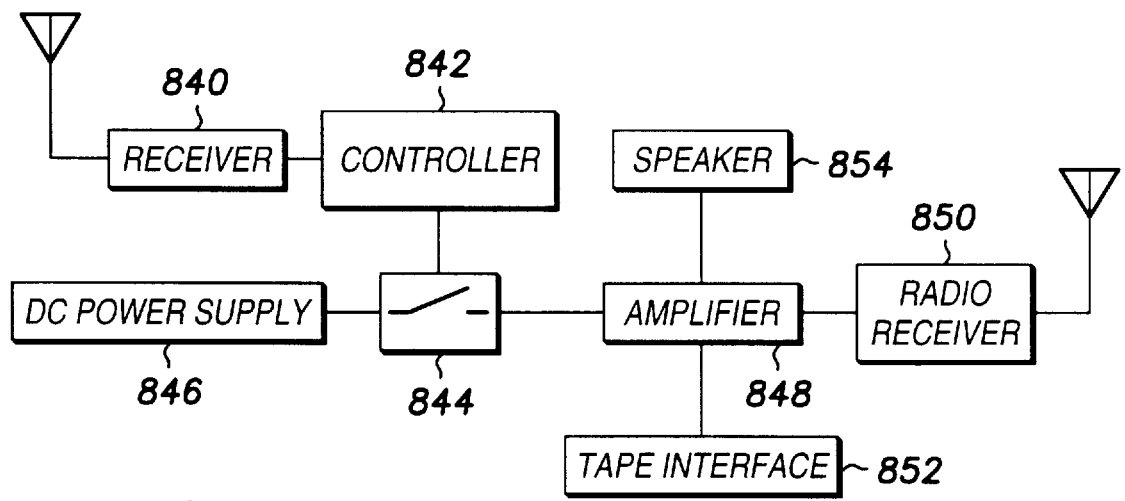
FIG. 44 is a block diagram of an embodiment of an apparatus for inhibiting operation of an electronic device integrated into the electronic device.

An embodiment of the apparatus for inhibiting operation of an electronic device, integrated into an unintelligent device is shown in FIG. 44. A receiver 840 receives a signal indicative of a take-off or a landing. A controller 842 connected to the receiver 840 opens and shuts a controllable switch 844, based on the signals received by the receiver 840. The controllable switch 844 connects a DC power supply 846 to the rest of the electronic device. The electronic device is depicted as a radio-tape player having an amplifier 848 with an input from a radio receiver 850 and a tape interface 852. The output of the amplifier 848 is a speaker 854.

Figure 45:
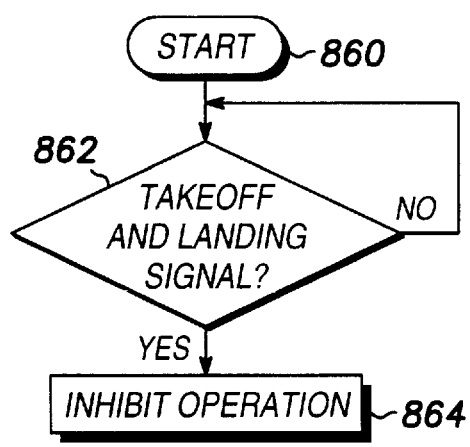
FIG. 45 is a flow diagram of steps performed in an embodiment of a method for inhibiting operation of an electronic device.

An embodiment of the method for inhibiting operation of an electronic device is shown in FIG. 45. The method starts at block 860. At block 862 it is determined if a take-off or landing signal has been received. When the take-off or landing signal is received, the operation of the electronic device is inhibited at block 864.

Thus there has been described an apparatus and method for inhibiting operation of an electronic device during take-offs and landings of an aircraft. When used in conjunction with an intelligent device, the apparatus and method initiates a shutdown procedure, that preserves any active files and closes any applications in an orderly fashion. While the invention has been described in conjunction with specific embodiments thereof, it is evident that many alternatives, modifications, and variations will be apparent to those skilled in the art in light of the foregoing description. Accordingly, it is intended the invention embrace all such alternatives, modifications, and variations as fall within the spirit and broad scope of the appended claims.

What is claimed is:

1. A method for inhibiting operation of an electronic device which performs non-aircraft function during take-off and landing of an aircraft, comprising the steps of:
   (a) sensing a parameter indicative of at least one of take-off and landing;
   (b) determining if the parameter indicative of at least one of take-off and landing exceeds a predetermined threshold; and
   (c) when the parameter indicative of at least one of take-off and landing exceeds the predetermined threshold for a predetermined period of time, inhibiting operation of the electronic device which performs non-aircraft function.

2. The method of claim 1, wherein step (b) further including the steps of:
   (b1) when the lateral acceleration does not exceed the predetermined threshold returning to step (a); and
   (b2) when the lateral acceleration does not exceed the predetermined threshold for the predetermined period of time, returning to step (a).

3. The method of claim 2, further including the steps of:
   (d) determining if the lateral acceleration is below a second predetermined threshold; and
   (e) when the lateral acceleration is below the second predetermined threshold for a second predetermined period of time, not inhibiting operation of the electronic device.

4. The method of claim 1, wherein the step of inhibiting operation of the electronic device includes the steps of:
   (c1) setting an inhibit operation flag; and
   (c2) starting a shut down procedure.

5. The method of claim 4, further including the steps of:
   (c3) when a start-up request is received, determining if the inhibit operation flag is set; and (c4) when the inhibit operation flag is set, denying the start-up request.

6. The method of claim 1, where the step of inhibiting operation of the electronic device includes the steps of:

(c1) activating an inhibit operation signal; and (c2) opening a power switch.

7. The method of claim 1, wherein step (c) is replaced with the following steps:

(c) determining if a second event has occurred; and (d) when the second event has occurred and the lateral acceleration exceeds the predetermined threshold for the predetermined period of time, inhibiting operation of the electronic device.

8. The method of claim 7, wherein step (c) further includes the step of determining if a vibration characteristic is present.

9. The method of claim 7, wherein step (c) further includes the step of determining if an absolute rate of ascent is present.

10. The method of claim 1, wherein the parameter indicative of at least one of take-off and landing is lateral acceleration.

11. An apparatus for inhibiting operation of an electronic device which performs non-aircraft function during take-off and landing of an aircraft, comprising:

a first sensor operative to measure a at least one of take-off and landing parameters; and a control circuit coupled to the first sensor and having an output coupled to the electronic device which performs non-aircraft function.

12. The apparatus of claim 11, further including a second sensor having an output, wherein the output of the second sensor and the output of the control circuit are inputs to an AND circuit.

13. The apparatus of claim 12, wherein the second sensor measures an absolute rate of ascent.

14. The apparatus of claim 12, wherein the second sensor is a vibration sensor.

15. The apparatus of claim 11, wherein the control circuit includes a comparator having an output of the first sensor as a first input and a predetermined threshold as a second input.

16. The apparatus of claim 11, wherein the control circuit includes a microprocessor.

17. The apparatus of claim 11, further including a controllable switch coupled the output of the control circuit.

18. The apparatus of claim 17, wherein the controllable switch is connected across a power line.

19. The apparatus of claim 11, wherein the electronic device includes a microprocessor and the output of the control circuit is connected to the microprocessor.

20. The apparatus of claim 11, wherein at least one of take-off and landing parameter is lateral acceleration.

21. A computer-readable storage medium having computer-readable data that when inserted into and executed by a computer device, performs the following steps:

(a) receiving a lateral acceleration from a sensor in the computer device;

(b) determining if the lateral acceleration exceeds a threshold; and (c) when the lateral acceleration exceeds the threshold for a period of time, inhibiting an operation of the computer device which performs non-aircraft function.

22. The computer-readable storage medium of claim 21, wherein step (b) further includes the steps of:

(b1) when the lateral acceleration does not exceed the predetermined threshold returning to step (a); and (b2) when the lateral acceleration does not exceed the predetermined threshold for the predetermined period of time, returning to step (a).

23. The computer-readable storage medium of claim 22, further including the steps of:

(d) determining if the lateral acceleration is below a second predetermined threshold; and (e) when the lateral acceleration is below the second predetermined threshold for a second predetermined period of time, not inhibiting operation of the electronic device.

24. A method for inhibiting operation of a carry-on electronic device during take-off and landing of an aircraft, comprising the steps of:

(a) sensing a lateral acceleration using the carry-on electronic device;

(b) determining if the lateral acceleration exceeds a predetermined threshold; and (c) when the lateral acceleration exceeds the predetermined threshold for a period of time, inhibiting operation of the carry-on electronic device.

25. The method of claim 24, wherein the carry-on electronic device is a radio.

26. The method of claim 24, wherein the carry-on electronic device is a tape player.

27. The method of claim 24, wherein the carry-on electronic device is an electronic book.

28. An apparatus for inhibiting operation of a carry-on electronic device which performs non-aircraft function during take-off and landing of an aircraft, comprising:

a first sensor operative to measure a lateral acceleration; and a control circuit coupled to the first sensor and having an output coupled to the carry-on electronic device.

29. The apparatus of claim 28, wherein the carry-on electronic device is a radio.

30. The apparatus of claim 28, wherein the carry-on electronic device is a tape player.

31. The apparatus of claim 28, wherein the carry-on electronic device is an electronic book.

* * * * *